US010733362B2

(12) United States Patent
Ishida et al.

(10) Patent No.: US 10,733,362 B2
(45) Date of Patent: Aug. 4, 2020

(54) EDITING APPARATUS

(71) Applicant: Brother Kogyo Kabushiki Kaisha, Nagoya-shi, Aichi-ken (JP)

(72) Inventors: Minako Ishida, Nagoya (JP); Shinya Goto, Handa (JP); Yasunori Suzuki, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 16/393,192

(22) Filed: Apr. 24, 2019

(65) Prior Publication Data
US 2019/0251151 A1 Aug. 15, 2019

Related U.S. Application Data

(62) Division of application No. 14/661,701, filed on Mar. 18, 2015, now Pat. No. 10,296,572.

(30) Foreign Application Priority Data

May 16, 2014 (JP) .................................. 2014-102575
Aug. 26, 2014 (JP) .................................. 2014-171141

(51) Int. Cl.
*G06F 3/048* (2013.01)
*G06F 40/166* (2020.01)
(Continued)

(52) U.S. Cl.
CPC ........ *G06F 40/166* (2020.01); *G06F 3/04812* (2013.01); *G06F 3/04842* (2013.01)

(58) Field of Classification Search
CPC ............... G06F 3/04842; G06F 3/0481; G06F 3/04812; G06F 40/166; G06F 17/24;
(Continued)

(56) References Cited

U.S. PATENT DOCUMENTS 5,613,019 A 3/1997 Altman et al.
5,760,773 A 6/1998 Berman et al.
(Continued)

FOREIGN PATENT DOCUMENTS

JP S64-010289 A 1/1989
JP H06-052150 A 2/1994
(Continued)

*Primary Examiner* — Phuong H Nguyen
(74) *Attorney, Agent, or Firm* — Banner & Witcoff, Ltd.

(57) ABSTRACT

An editing apparatus includes a processor and a memory. The processor performs processes. The processes include causing a print image to be displayed in a first area, and a mark and at least one portion of a target character string to be displayed in a second area. The processes include causing a selection image to be displayed in a third area. The processes include performing a first determination whether a corresponding block included in the print image overlaps with the selection image. The processes include causing the entire corresponding block to be displayed in a first residual area. The processes include performing a second determination whether the mark overlaps with the selection image. The processes include reducing a size of the target character string. The processes include causing the mark and at least one portion of a reduced character string to be displayed in a second residual area.

10 Claims, 11 Drawing Sheets

(51) Int. Cl.
*G06F 3/0484* (2013.01)
*G06F 3/0481* (2013.01)

(58) Field of Classification Search
CPC . G06F 2203/04806; G06F 2203/04805; G06F 3/04892; G06F 40/106
See application file for complete search history.

(56) References Cited

U.S. PATENT DOCUMENTS

| | | |
|---|---|---|
| 5,873,110 A | 2/1999 | Toyosawa et al. |
| 5,907,851 A | 5/1999 | Yamakawa et al. |
| 6,490,604 B1 | 12/2002 | Toyosawa et al. |
| 8,782,550 B1 | 7/2014 | Patridge et al. |
| 8,963,864 B2 | 2/2015 | Imamura |
| 2003/0110441 A1 | 6/2003 | Tsukuda et al. |
| 2011/0273540 A1* | 11/2011 | Lee ................... G06F 3/0346 348/51 |
| 2012/0072867 A1* | 3/2012 | Schlegel ............... G06F 3/0481 715/808 |
| 2015/0227219 A1 | 8/2015 | Yamada et al. |

FOREIGN PATENT DOCUMENTS

| | | |
|---|---|---|
| JP | H06-332571 A | 12/1994 |
| JP | H09-212502 A | 8/1997 |
| JP | 2001-042985 A | 2/2001 |
| JP | 2001-042992 A | 2/2001 |
| JP | 2004-272647 A | 9/2004 |
| JP | 2005-216181 A | 8/2005 |
| WO | 96016813 A1 | 6/1996 |

\* cited by examiner

US 10,733,362 B2

EDITING APPARATUS

CROSS-REFERENCE TO RELATED APPLICATION

This application is a Divisional Application of U.S. Ser. No. 14/661,701, filed on Mar. 18, 2015, which claims priority to Japanese Patent Application No. 2014-102575 filed May 16, 2014 and Japanese Patent Application No. 2014-171141 filed Aug. 26, 2014. The contents of the foregoing applications are hereby incorporated herein by reference.

BACKGROUND

The present disclosure relates to an editing apparatus that is capable of editing, in accordance with a user operation, a character string that is displayed on a display portion.

An editing apparatus is known that is capable of editing, in accordance with a user operation, a character string that is displayed on a display portion. Specific examples of editing actions are the adding and inserting of a character and a symbol to the character string, as well as the deleting of a character that is included in the character string. A technology is known that displays on a display portion a window in which a plurality of editing actions are shown in list form as candidates for selection. The user may perform an operation that selects one of the plurality of the editing actions in the window. The user is thus able use the selected edit action to edit the character string that is displayed on the display portion.

SUMMARY

Embodiments provide an editing apparatus that includes a processor and a memory. The memory is configured to store computer-readable instructions, wherein the computer-readable instructions, when executed by the processor, cause the editing apparatus to perform processes that include causing a print image to be displayed in a first area of a display portion and a mark and at least one portion of a target character string to be displayed in a second area of the display portion, the print image including a plurality of blocks, a plurality of character strings being respectively associated with the plurality of the blocks, the target character string being one of the plurality of the character strings that corresponds to a corresponding block, the corresponding block being one of the plurality of the blocks, the mark indicating a position where editing is to be performed on the target character string, and the second area being a different area from the first area, causing a selection image to be displayed in a third area of the display portion in a state in which the print image is displayed in the first area and the target character string is displayed in the second area, the selection image being an image to be used for selecting one of a plurality of editing actions, and the third area including at least one portion of the first area and at least one portion of the second area, performing a first determination whether the corresponding block included in the print image displayed in the first area overlaps with the selection image displayed in the third area, causing the entire corresponding block to be displayed in a first residual area by modifying a form in which the print image is displayed, in response to determining that the corresponding block overlaps with the selection image, the first residual area being an area, within the first area, that is exclusive of the third area, performing a second determination whether the mark displayed in the second area overlaps with the selection image displayed in the third area, reducing a size of the target character string in response to determining that the mark overlaps with the selection image, and causing the mark and at least one portion of a reduced character string to be displayed in a second residual area, the reduced character string being the target character string whose size is reduced, and the second residual area being an area, within the second area, that is exclusive of the third area.

BRIEF DESCRIPTION OF THE DRAWINGS

Embodiments will be described below in detail with reference to the accompanying drawings in which.

DETAILED DESCRIPTION

Figure 1:
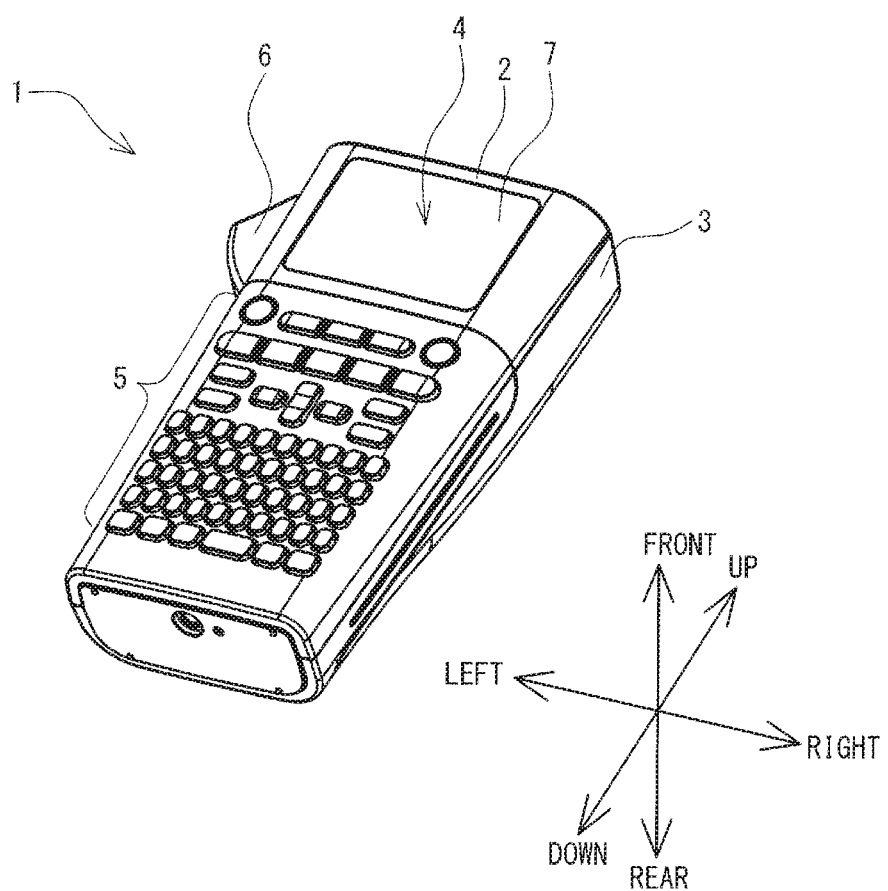
FIG. 1 is an oblique view of a printer.

Embodiments will be explained with reference to the drawings. In the explanation that follows, the top side, the bottom side, the upper right side, the lower left side, the upper left side, and the lower right side in FIG. 1 respectively define the front side, the rear side, the top side, the bottom side, the left side, and the right side of a printer 1. As shown in FIG. 1, the printer 1 is a hand-held electronic device that a user can operate while holding the printer 1 in the hand. In accordance with input operations that are made using a keyboard 5 and a touch panel 7, the printer 1 is able to perform editing of a character string that is displayed on a display portion 4. The printer 1 is able to generate printing data based on the character string that is displayed on the display portion 4. Based on the generated printing data, the printer 1 is able to perform printing by forming a plurality of dots on a tape (a cover film) that is a printing medium. In this manner, the printer 1 is able to create a label.

The printer 1 includes a body 2 and a cover 3. The body 2 has a substantially three-dimensional rectangular shape whose long axis extends up and down. The body 2 includes the display portion 4, the keyboard 5, a lever 6, and the touch panel 7. The display portion 4 and the keyboard 5 are provided on the front face of the body 2. The lever 6 is provided on the left side face of the body 2. The display portion 4 is a liquid crystal display that is capable of displaying a character for printing. The shape of the display portion 4 is rectangular, with its long axis extending left to right in a plan view. The touch panel 7 is provided on the surface of the display portion 4. The keyboard 5 is provided below the display portion 4. The keyboard 5 includes input keys and functional keys. The input keys include character keys (text characters, numeric characters, and the like), direction keys (up, down, left, right), a Delete key, and a Backspace key. The functional keys include Function keys (hereinafter called the Fn keys) and a Print key. A cutter can cut the tape in response to the pressing of the lever 6. The portion of the tape on which the printing has been done can thus be cut off.

A cassette mounting portion (not shown in the drawings) is provided on the rear side of the body 2. A tape cassette can be mounted in the cassette mounting portion. The cover 3 is provided on the rear side of the cassette mounting portion. The cover 3 can be opened and closed. In its closed state, the cover 3 can cover the tape cassette. When the cover 3 is in the open state, the user is able to replace the tape cassette. The tape cassette includes an ink ribbon roll, a base material tape roll, and a cover film roll.

From the ink ribbon roll, the base material tape roll, and the cover film roll of the tape cassette, the printer 1 draws out an ink ribbon, a base material tape, and the cover film, respectively. The printer 1 performs printing on the cover film by using a thermal head 10 (refer to FIG. 2) to heat the ink ribbon. The printer 1 sticks the base material tape onto the printed cover film. By this process, the printer 1 can create a label in which the printed cover film and the base material tape are stuck together.

Figure 2:
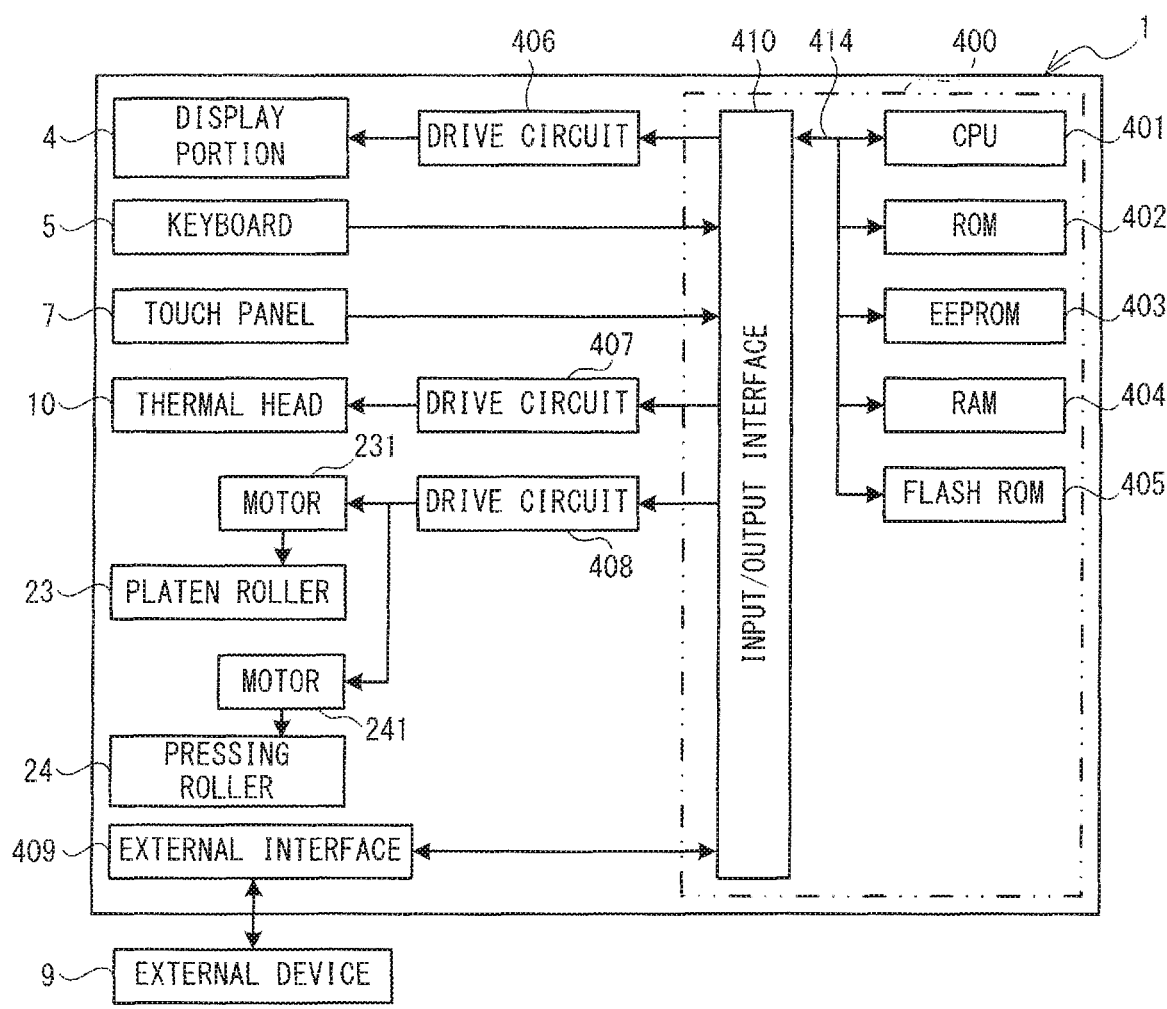
FIG. 2 is a block diagram that shows an electrical configuration of the printer.

An electrical configuration of the printer 1 will be explained with reference to FIG. 2. The printer 1 includes a control circuit 400. The control circuit 400 is formed on a control circuit board that is fixed in place inside the body 2 (refer to FIG. 1). The control circuit 400 includes a CPU 401, a ROM 402, an EEPROM 403, a RAM 404, a flash ROM 405, and an input/output interface 410. The CPU 401, the ROM 402, the EEPROM 403, the RAM 404, the flash ROM 405, and the input/output interface 410 are electrically connected through a bus 414.

The CPU 401 controls the entire printer 1. The ROM 402 stores programs that the CPU 401 can execute. The CPU 401 performs various types of computations based on the programs that are stored in the ROM 402. The EEPROM 403 stores sets of dot pattern data for printing, which are classified according to format and size, in association with code data. The dot pattern data for printing are data for printing text characters, numeric characters, symbols, and bar codes.

The RAM 404 stores data temporarily. The flash ROM 405 stores the printing data that are generated.

The keyboard 5, the touch panel 7, drive circuits 406, 407, 408, and an external interface 409 are connected to the input/output interface 410. The drive circuit 406 includes a video RAM (not shown in the drawings) for displaying images on the display portion 4. The drive circuit 406 performs display control of the display portion 4. The keyboard 5 outputs to the input/output interface 410 information that indicates the type of a selected key. The touch panel 7 outputs to the input/output interface 410 coordinate information that indicates a touched position. The drive circuit 407 causes electricity to flow through heating elements of the thermal head 10. The drive circuit 408 rotationally drives motors 231 and 241. The motor 231 is connected to a platen roller 23. The platen roller 23 can rotate in accordance with the rotational drive of the motor 231 while pressing the cover film and the ink ribbon against the thermal head 10. The motor 241 is connected to a pressing roller 24. The pressing roller 24 can rotate in accordance with the rotational drive of the motor 241 while pressing the base material tape against the printed cover film. The external interface 409 is a communication integrated circuit (IC) for performing communication with an external device 9. The external device 9 may be a general-purpose PC.

An edit screen 100 (edit screens 100A to 100C) according to a first embodiment will be explained with reference to FIG. 3. The edit screen 100A is displayed on the display portion 4 in a case where an operation is input through the keyboard 5 to start editing of a character string that is to be printed on the tape. The edit screen 100 includes a character string 40, a cursor 41, a font setting 42, a tape length 43, and a partition line 44. The partition line 44 extends horizontally across the display portion 4 at a point that is higher than the center, in the up-down direction, of the display portion 4. Hereinafter, the area within the display portion 4 that is below the partition line 44 is called the first display area 4A. Hereinafter, the area within the display portion 4 that is above the partition line 44 is called the second display area 4B.

The character string 40 is displayed in the first display area 4A. The character string 40 is a character string to be printed. The maximum number of lines of the character string 40 that can be displayed on the edit screen 100 is one. The character string 40 includes a plurality of characters 40A. The plurality of the characters 40A are arrayed in the left-right direction. The maximum number of the characters 40A that can be displayed on the display portion 4 is 20. The character string 40 is displayed left-justified.

The cursor 41 is a mark that indicates the position that is to be edited when the character string 40 is edited. The cursor 41 is a straight line segment that extends vertically. The vertical length of the cursor 41 is approximately equal to the vertical length of each one of the plurality of the characters 40A. The cursor 41 blinks at regular intervals. The cursor 41 is positioned to one of the left and the right of one of the plurality of the characters 40A.

In a case where a character key on the keyboard 5 is pressed, for example, the character that corresponds to the pressed character key is added to the character string 40 at the position to the right of the cursor 41 and displayed. In this case, the position to the right of the cursor 41 is specified as an adding position where the character is added. In a case where a character is added at the adding position, the cursor 41 is moved to the right side of the added character. In a case where the Delete key on the keyboard 5 is pressed, for example, the one of the plurality of the characters 40A that is to the right of the cursor 41 is deleted from the character string 40. In this case, the position to the right of the cursor 41 is specified as a deleting position where the character 40A is deleted. In a case where a character 40A is deleted by the pressing of the Delete key, the cursor 41 is not moved. In a case where the Backspace key on the keyboard 5 is pressed, for example, the one of the plurality of the characters 40A that is to the left of the cursor 41 is deleted from the character string 40. In this case, the position to the left of the cursor 41 is specified as the deleting position where the character is deleted. In a case where a character is deleted by the pressing of the Backspace key, the cursor 41 is moved to the right side of the character 40A that is positioned on the left side of the deleted character 40A. The cursor 41 is moved to one of the left and the right in response to the pressing of the direction key on the keyboard 5.

It is assumed that the printer 1 is operated while being held in the hand. Accordingly, the size of the printer 1 is smaller than that of a stationary printer, and the resolution of the display portion 4 is lower. Therefore, as described above, the number of lines of the character string 40 and the number of the plurality of the characters 40A that can be displayed on the display portion 4 at one time are restricted. That means that in a case where the total number of the plurality of the characters 40A in the character string 40 is greater than the maximum number of characters (twenty characters), the CPU 401 is not able to display all of the plurality of the characters 40A on the display portion 4 at one time. In that case, the CPU 401 moves (scrolls) the character string 40 to the left, such that the cursor 41 is constantly displayed on the display portion 4.

The shape of the cursor 41 and the locations of the adding position and the deleting position in relation to the cursor 41 are not limited to the examples described above. For example, the shape of the cursor 41 may be a rectangle of a size that is able to cover any one of the plurality of the characters 40A. In that case, among the plurality of the characters 40A of the character string 40, the cursor 41 can be disposed to the left of the leftmost (first) character 40A, to the right of the rightmost (last) character 40A, and at the position of any one of the plurality of the characters 40A. In that case, the position of the cursor 41 may be specified as the adding position and the deleting position.

The font setting 42 and the tape length 43 are displayed in the second display area 4B. The font setting 42 includes a font 421 and a character size 422. An image of the character size 422 (an image of three overlapping letters "A") indicates an operating mode in which the character size is automatically adjusted to match the width of the tape. The tape length 43 indicates the length of the tape that is to be printed by the printer 1.

Figure 3:
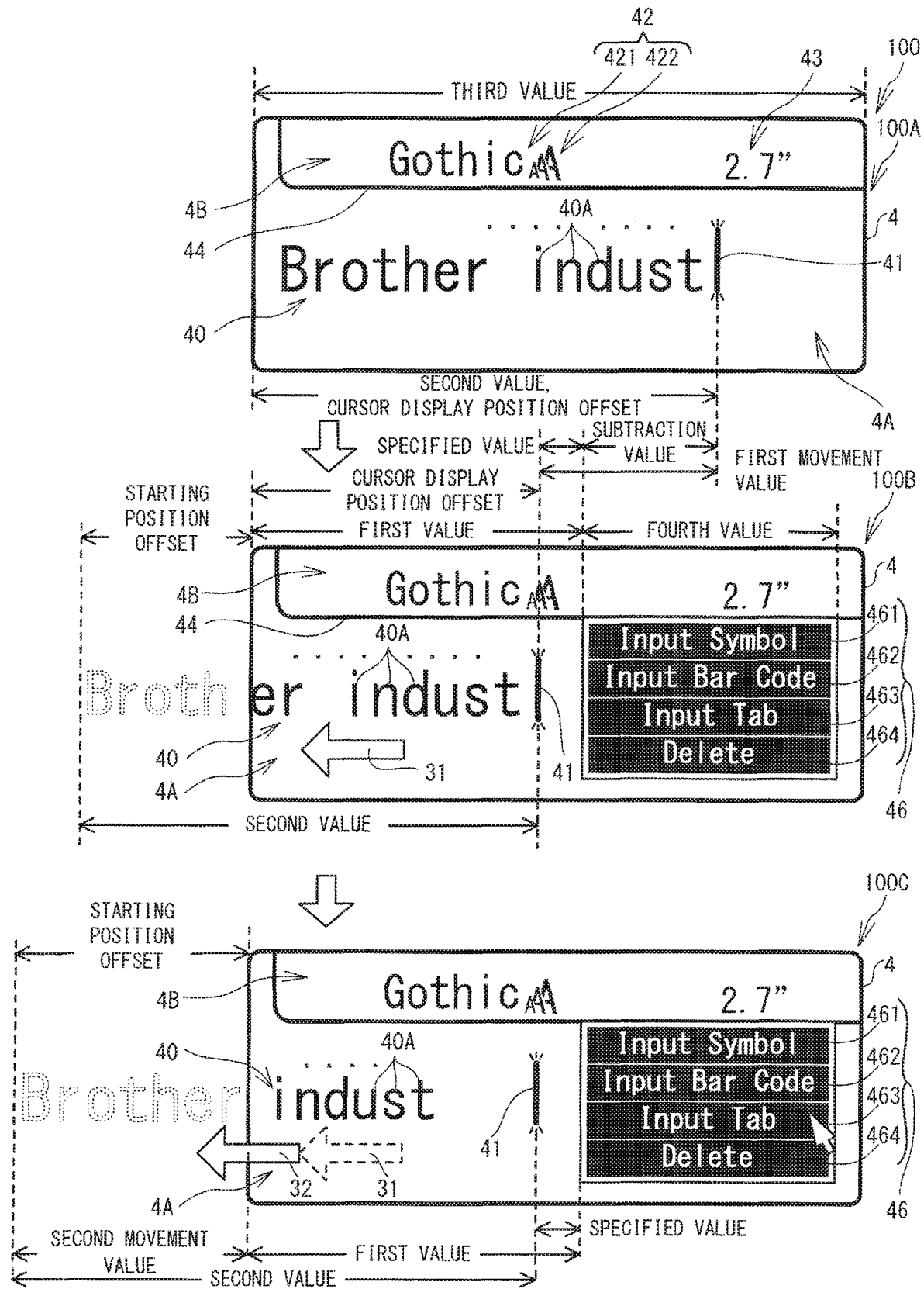
FIG. 3 is a figure that shows edit screens according to a first embodiment.

In a case where one of the Fn keys on the keyboard 5 is pressed, the edit screen 100B, an example of which is shown in FIG. 3, is displayed. In a case where one of the Fn keys is pressed, a selection image 46 is displayed within the first display area 4A on the display portion 4, to the right of the center, in the left-right direction, of the display portion 4. The overall shape of the selection image 46 is a rectangle whose long axis extends in the left-right direction. The length of the selection image 46 in the left-right direction is less than half of the length of the display portion 4 in the left-right direction. The length of the selection image 46 in the up-down direction is slightly less than the length of the first display area 4A in the up-down direction. The position of the top edge of the selection image 46 is congruent with the position of the partition line 44. The bottom edge of the selection image 46 is positioned above the bottom edge of the display portion 4. The left edge of the selection image 46 is positioned to the right of the center, in the left-right direction, of the display portion 4. The right edge of the selection image 46 is positioned to the left of the right edge of the display portion 4.

The selection image 46 is given priority for display over the character string 40 and the cursor 41. Therefore, in a case where the selection image 46 is displayed such that the character string 40 and the cursor 41 overlap with the selection image 46, priority is given to displaying the selection image 46 in the area of overlap, and the character string 40 and the cursor 41 are not displayed in that area.

The selection image 46 is partitioned into menu images 461, 462, 463, and 464, in which characters that describe a plurality of editing actions, "Input Symbol", "Input Bar Code", "Input Tab", and "Delete", are respectively displayed. The menu images 461 to 464 are arrayed in the up-down direction. In a case where a selection operation in which the position of one of the menu images 461 to 464 in the selection image 46 is touched is detected through the touch panel 7, the CPU 401 edits the character string 40 with the corresponding editing action.

The menu image 461 ("Input Symbol") corresponds to an editing action that adds to the character string 40 a symbol that is not included on the keyboard 5. In a case where a selection operation in which the menu image 461 is touched is detected through the touch panel 7, the CPU 401 displays in the menu image 461 a list of a plurality of symbols that can be added, instead of displaying the characters "Input Symbol". In a case where a selection operation in which the position of one of the plurality of the symbols is touched is detected through the touch panel 7, the CPU 401 adds the corresponding symbol to the character string 40 in the adding position to the right of the cursor 41 and displays the symbol.

The menu image 462 ("Input Bar Code") corresponds to an editing action that adds a bar code to the character string 40. In a case where a selection operation in which the menu image 462 is touched is detected through the touch panel 7, the CPU 401 displays in the menu image 462 an input screen through which a plurality of numerals can be input, instead of displaying the characters "Input Bar Code". In a case where an operation by which a plurality of numerals have been input is detected through the keyboard 5, the CPU 401 creates a bar code that indicates the detected numerals. The CPU 401 adds the created bar code to the character string 40 in the adding position to the right of the cursor 41 and displays the bar code.

The menu image 463 ("Input Tab") corresponds to an editing action that inputs a tab. In a case where a selection operation in which the menu image 463 is touched is detected through the touch panel 7, the CPU 401 adds a tab to the character string 40 in the adding position to the right of the cursor 41 and displays the tab.

The menu image 464 ("Delete") corresponds to an editing action that deletes one of the plurality of the characters 40A from the character string 40. In a case where a selection operation in which the menu image 464 is touched is detected through the touch panel 7, the CPU 401 deletes from the character string 40 the character 40A that is in the deleting position to the left of the cursor 41. The editing action by the menu image 464 ("Delete") is the same as the editing action in a case where the Backspace key is pressed on the keyboard 5.

A menu image other than those described above may be included in the selection image 46. A scroll bar may be provided in the selection image 46, such that any one of a plurality of menu images is selectively displayed.

A case in which one of the Fn keys is pressed and the selection image 46 is displayed while the edit screen 100A is being displayed is used as an example. The character string 40 "Brother indust" is displayed on the edit screen 100A. The cursor 41 is displayed to the right of the last character 40A "t" of the character string 40. The position of the cursor 41 is to the right of the center, in the left-right direction, of the display portion 4. It is assumed that the selection image 46 is displayed while the position of the character string 40 in the edit screen 100A is maintained. In that case, the selection image 46 overlaps the cursor 41 and a portion of the character string 40, and the cursor 41 and the portion of the character string 40 are not displayed. In contrast, as shown in the edit screen 100B, the CPU 401 moves the character string 40 and the cursor 41 to the left (the arrow 31) to a position where the cursor 41 is not overlapped by the displayed selection image 46, or more specifically, until the cursor 41 is disposed in a position that is one character's width to the left of the left edge of the displayed selection image 46. The user is therefore able to check the position of the cursor 41 in relation to the character string 40, even after the selection image 46 is displayed. The user is also able to check one of the adding position and the deleting position that is indicated by the cursor 41. The user is therefore able to recognize the adding position and the deleting position in relation to the character string 40, even after the selection image 46 is displayed. Accordingly, the user may easily perform editing of the character string 40 by selecting one of the menu images 461 to 464. The moving of the character string 40 causes at least one of the plurality of the characters 40A at the left end (the start) of the character string 40 to cease to be displayed on the display portion 4.

A case in which an operation that selects the menu image 463 ("Input Tab") in the selection image 46 is performed while the edit screen 100B is being displayed is used as an example. In this case, the CPU 401 first adds a tab to the character string 40 in the adding position, then moves the cursor 41 to the right side of the added tab. Next, as shown in the edit screen 100C, the CPU 401 moves the character string 40 farther to the left (the arrow 32) to a position where the cursor 41 is not overlapped by the displayed selection image 46 after the tab has been added, or more specifically, until the cursor 41 is disposed in a position that is one character's width to the left of the left edge of the displayed selection image 46. The user is therefore able to continue checking the position of the cursor 41 in relation to the character string 40, even after the menu image 463 of the selection image 46 is selected and the character string 40 is edited. The user is also able to continue checking the adding position or the deleting position that is indicated by the cursor 41. The CPU 401 also moves the character string 40 to the left to a position where the cursor 41 is not overlapped by the displayed selection image 46 in a case in which operations that select any one of the menu image 461 ("Input Symbol") and the menu image 462 ("Input Bar Code") are performed, although these cases are not be explained in detail. The user is therefore able to continue recognizing the adding position and the deleting position in relation to the character string 40, even after the character string 40 is edited in accordance with an editing action that corresponds to one of the menu images 461 to 463.

A case in which an operation that selects the menu image 464 ("Delete") in the selection image 46 is performed while the edit screen 100C is being displayed is used as an example. In this case, the CPU 401 first deletes the tab in the deleting position to the left of the cursor 41 in the character string 40, then moves the cursor 41 to the right side of the character 40A "t" that was to the left of the deleted tab. Next, the CPU 401 moves the character string 40 to the right by the amount that the character string 40 was moved to the left (the arrow 32) when the tab was added by the selecting of the menu image 463 ("Input Tab"). That causes the edit screen 100C to revert to the edit screen 100B. In other words, the CPU 401 moves the character string 40 to the right until the cursor 41 is disposed in a position that is one character's width to the left of the left edge of the displayed selection image 46. In this case, the user is able to recognize a greater number of the characters 40A that are contained in the character string 40, while continuing to recognize the position of the cursor 41 and to recognize the adding position or the deleting position in relation to the character string 40.

In a case where one of the Fn keys is pressed again while one of the edit screen 100B and the edit screen 100C is being displayed, the selection image 46 is deleted, and the edit screen 100 reverts to the original edit screen 100A. In a case where the Print key on the keyboard 5 is pressed while one of the edit screens 100A to 100C is being displayed, the CPU 401 generates the printing data for printing the character string 40 on the tape (the cover film). The CPU 401 creates a label by printing the character string 40 on the tape (the cover film) based on the generated printing data.

The specific processing that the CPU 401 performs in the first embodiment in order to implement an editing operation on the character string 40 that are described above will be explained. Programs for first main processing (refer to FIG. 4) and second main processing (refer to FIG. 5) are stored in the ROM 402. The first main processing and the second main processing are started by the CPU 401's executing of the programs that are stored in the ROM 402 when an operation for starting the editing of the character string 40 is performed through the keyboard 5. The first main processing corresponds to the editing processing of the character string 40 that is performed when a character key on the keyboard 5 is pressed. The second main processing corresponds to the editing processing of the character string 40 that is performed when one of the menu images 461 to 464 (refer to FIG. 3) in the selection image 46 is selected. The first main processing and the second main processing are performed in parallel.

A character string buffer that is used when the first main processing and the second main processing are performed by the CPU 401 will be explained. The plurality of the characters 40A of the character string 40 (refer to FIG. 3) are stored in order in the character string buffer in response to the pressing of a character key on the keyboard 5 or the selecting of one of the menu images 461 to 464 in the selection image 46. The plurality of the characters 40A include a symbol, a bar code, and a tab.

Variables that are used when the first main processing and the second main processing are performed by the CPU 401 will be explained with reference to FIG. 3. Specifically, the variables are a cursor display position offset, a first value, a second value, a third value, a fourth value, a subtraction value, a specified value, a starting position offset, a first movement value, and a second movement value. For the variables, a single unit is defined as the left-right width of a single character that is displayed on the display portion 4. In the present embodiment, it is assumed that the plurality of the characters 40A of the character string 40 that is displayed in the first display area 4A are all full-width characters.

The cursor display position offset indicates the display position of the cursor 41 by the left-right length of the interval from the left edge of the display portion 4 to the position of the cursor 41. The first value indicates the left-right length of the interval from the left edge of the display portion 4 to the left edge of the selection image 46, when the selection image 46 is being displayed on the display portion 4. The second value indicates the left-right length of the interval from the left end (the start) of the character string 40 to the position of the cursor 41. The third value indicates the left-right length of the display portion 4. The fourth value indicates the left-right length of the selection image 46. The first value, the third value, and the fourth value are specified by at least one of the size of the display portion 4 and the size of the selection image 46. Therefore, the first value, the third value, and the fourth value are fixed values. In contrast, the second value varies according to the number of the plurality of the characters 40A in the character string 40. The second value is therefore a variable value.

The subtraction value indicates the length of the interval between the left edge of the selection image 46 when the selection image 46 is being displayed on the display portion 4 and the position of the cursor 41 in a case where the character string 40 is being displayed on the display portion 4 in order from its left end (its start). In other words, in a case where the selection image 46 is being displayed on the display portion 4, the subtraction value indicates the minimum amount of movement when the character string 40 is moved to the left in order to position the cursor 41 to the left of the selection image 46. The subtraction value is computed by subtracting the first value from the second value. The specified value indicates a value that is determined in advance. In the present embodiment, the specified value is 1.

The starting position offset indicates the position of the character 40A at the left end of the portion of the character string 40 that is being displayed on the display portion 4 in terms of its distance from the left end (the start) of the entire character string 40. In a case where the selection image 46 is being displayed on the display portion 4, the first movement value is the actual amount of movement when the character string 40 and the cursor 41 are moved to the left in order to dispose the cursor 41 to the left of the selection image 46. The first movement amount is computed by adding the specified value to the subtraction value (subtraction value+specified value). Therefore, the first movement value is greater than the subtraction value by the amount of specified value. The second movement value is the actual amount of movement in a case where the character string 40 is moved to the right when the selection image 46 is switched from the displayed state to the not-displayed state. The second movement value is computed by subtracting the difference between the first value and the specified value from the second value (second value−(first value−specified value)). In a case where the value of the computation result is negative, the second movement value is set to zero.

The RAM 404 stores the second value, the starting position offset, the first movement value, the second movement value (refer to FIG. 3), the subtraction value, the character string buffer, and the cursor display position offset. The flash ROM 405 stores the first value, the third value, the fourth value, and the specified value.

Figure 4:
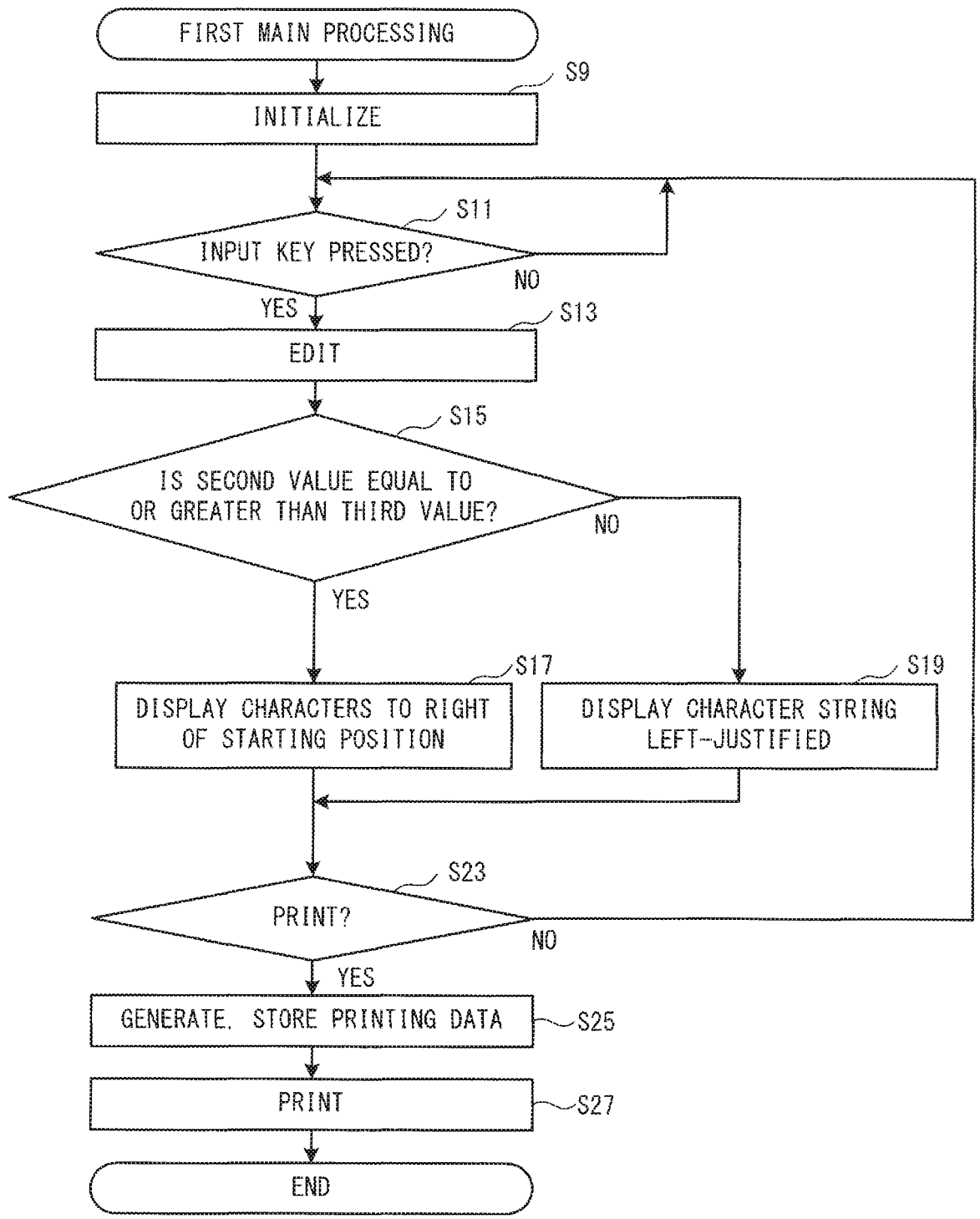
FIG. 4 is a flowchart of first main processing.

The first main processing will be explained with reference to FIG. 4. The CPU 401 performs initialization by setting the character string buffer, the second value, and the cursor display position offset to zero in the RAM 404 (Step S9). The CPU 401 determines whether the CPU 401 detects an operation that presses an input key (one of a character key, a direction key, the Delete key, and the Backspace key) on the keyboard 5 (Step S11). In a case where it is determined that an operation that presses an input key is not detected (NO at Step S11), the CPU 401 returns the processing to Step S11. The CPU 401 continues to wait for the pressing of an input key. In a case where it is determined that an operation that presses an input key is detected (YES at Step S11), the CPU 401 performs the editing action that corresponds to the pressed input key, performing the editing action on the one of the plurality of the characters 40A that is to one of the left and the right of the position that is indicated by the second value in the character string 40 that is stored in the character string buffer (Step S13). In a case where the CPU 401 performs the adding of a character 40A, the CPU 401 updates the second value and the cursor display position offset by adding 1 to each of the second value and the cursor display position offset in order to move the cursor 41 one character's width to the right (Step S13). In a case where the CPU 401 performs the deleting of a character 40A according to the pressing of the Backspace key, the CPU 401 updates the second value and the cursor display position offset by subtracting 1 from each of the second value and the cursor display position offset in order to move the cursor 41 one character's width to the left (Step S13).

For example, it is assumed that, in a state in which the plurality of the characters 40A "B", "r", "o", "t", "h", and "e" of the character string 40 "Brothe" are stored in the character string buffer and the cursor display position offset is 6 (to the right of "e"), the CPU 401 detects that the input key "r" is pressed. In this case, the character 40A "r" is stored in the character string buffer, changing the character string 40 to "Brother". The CPU 401 adds 1 to both the second value and the cursor display position offset, updating the second value and the cursor display position offset from 6 to 7. In this state, in a case where the CPU 401 detects that the Backspace key is pressed, for example, the CPU 401 deletes the character 40A "r" from the character string buffer, changing the character string 40 to "Brothe". The CPU 401 subtracts 1 from both the second value and the cursor display position offset, updating the second value and the cursor display position offset from 7 to 6.

The CPU 401 determines whether the second value is equal to or greater than the third value (Step S15). In a case where the second value is equal to or greater than the third value, the position of the cursor 41 is located to the right of the right edge of the display portion 4 when the entire character string 40 is displayed on the display portion 4, starting from its left end (the start). In a case where it is determined that the second value is equal to or greater than the third value (YES at Step S15), the CPU 401 computes the starting position offset by subtracting the third value from the second value (second value−third value). The CPU 401 determines the position that is offset to the right (toward the end) from the left end (the start) of the character string 40 that is stored in the character string buffer by the amount of the computed starting position offset, then sets that position as the position within the character string 40 that is to be displayed at the left edge of the display portion 4. The CPU 401 takes characters 40A in the portion of the character string 40 that starts at the position set by the CPU 401, and displays those characters 40A left-justified on the display portion 4 (Step S17). The CPU 401 updates the cursor display position offset by subtracting the starting position offset from the cursor display position offset. The CPU 401 displays the cursor 41 at the position that is indicated by the updated cursor display position offset (Step S17). Before being updated, the cursor display position offset was equal to the second value, so the updated cursor display position offset becomes equal to the third value. Therefore, the cursor 41 is displayed at the right edge of the display portion 4. The CPU 401 advances the processing to Step S23.

On the other hand, in a case where the second value is less than the third value, the position of the cursor 41 is located to the left of the right edge of the display portion 4 when the entire character string 40 is displayed on the display portion 4, starting from its left end (the start). In a case where it is determined that the second value is less than the third value (NO at Step S15), the CPU 401 sets the starting position offset to zero in order to set the left end (the start) of the character string 40 that is stored in the character string buffer as the position within the character string 40 that is to be displayed at the left edge of the display portion 4. The CPU 401 displays the character string 40 on the display portion 4 (Step S19). In this manner, the entire character string 40 that is stored in the character string buffer is displayed left-justified on the display portion 4, starting from the beginning. The CPU 401 displays the cursor 41 in the position that is indicated by the cursor display position offset (Step S19). The CPU 401 advances the processing to Step S23.

The CPU 401 determines whether the CPU 401 detects an operation that presses the Print key on the keyboard 5 (Step S23). In a case where it is determined that an operation that presses the Print key is not detected (NO at Step S23), the CPU 401 returns the processing to Step S11. The CPU 401 continues to wait for the pressing of an input key. In a case where it is determined that an operation that presses the Print key on the keyboard 5 is detected (YES at Step S23), the CPU 401 generates the printing data for printing the character string 40 that is stored in the character string buffer on the tape, according to the printing conditions that are displayed in the second display area 4B, then stores the printing data in the flash ROM 405 (Step S25). Based on the printing data that are stored in the flash ROM 405, the CPU 401 prints the character string 40 on the cover film (Step S27). The CPU 401 creates a label by sticking the base material tape onto the printed cover film. The CPU 401 then terminates the first main processing.

Figure 5:
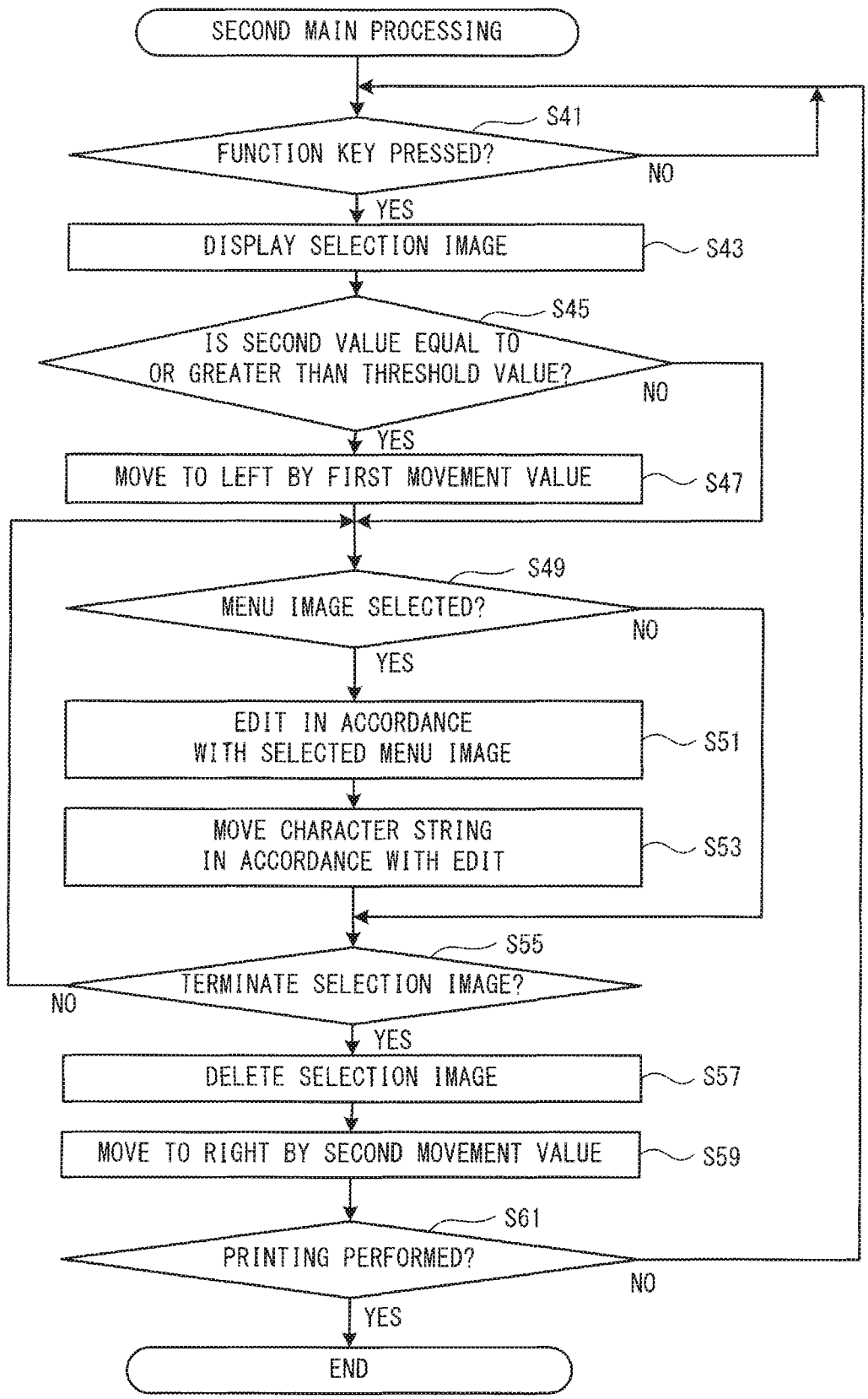
FIG. 5 is a flowchart of second main processing.

The second main processing will be explained with reference to FIG. 5. The CPU 401 determines whether the CPU 401 detects an operation that presses one of the Fn keys (Step S41). In a case where it is determined that an operation that presses one of the Fn keys is not detected (NO at Step S41), the CPU 401 returns the processing to Step S41. The CPU 401 continues to wait for the pressing of one of the Fn keys. In a case where it is determined that an operation that presses one of the Fn keys is detected (YES at Step S41), the CPU 401 displays the selection image 46 on the display portion 4 (Step S43). The CPU 401 advances the processing to Step S45.

The CPU 401 computes a threshold value by subtracting the specified value from the first value. The CPU 401 determines whether the second value is equal to or greater than the threshold value (Step S45). In a case where the second value is equal to or greater than the threshold value, when the selection image 46 is displayed on the display portion 4 while the entire character string 40 continues to be displayed on the display portion 4, the cursor 41 is displayed to the right of the position that is one character's width to the left of the left edge of the selection image 46. In this case, the user is unable to check the position of the cursor 41, as well as one of the adding position and the deleting position that are indicated by the cursor 41. In a case where it is determined that the second value is equal to or greater than the threshold value (YES at Step S45), the CPU 401 performs the computations hereinafter described. The CPU 401 computes the subtraction value by subtracting the first value from the second value. The CPU 401 computes the first movement value by adding the specified value 1 to the computed subtraction value. The CPU 401 moves the character string 40 and the cursor 41 that are displayed on the display portion 4 to the left by the amount of the first movement value (Step S47). The CPU 401 advances the processing to Step S49.

The processing at Step S47 will now be described in detail. The CPU 401 updates the starting position offset by setting the starting position offset to the first movement value. The CPU 401 determines the position that is offset to the right (toward the end) from the left end (the start) of the character string 40 that is stored in the character string buffer by the amount of the updated starting position offset, then sets that position as the position within the character string 40 that is to be displayed at the left edge of the display portion 4. The CPU 401 takes characters 40A in the portion of the character string 40 that starts at the position that is set by the CPU 401 and displays those characters 40A left-justified on the display portion 4 (Step S47). The CPU 401 updates the cursor display position offset by subtracting the first value from the second value and using the result to set the cursor display position offset. The CPU 401 displays the cursor 41 in the position that is indicated by the updated cursor display position offset (Step S47). The cursor 41 is displayed in the position that is one character's width to the left of the left edge of the selection image 46.

On the other hand, in a case where the second value is less than the threshold value, when the selection image 46 is displayed on the display portion 4 while the entire character string 40 continues to be displayed on the display portion 4, the cursor 41 is displayed in either the position that is one character's width to the left of the left edge of the selection image 46 or a position to the left of the position that is one character's width to the left of the left edge of the selection image 46. In this case, the user is able to check the position of the cursor 41 in relation to the character string 40 and to check one of the adding position and the deleting position that is indicated by the cursor 41, even if the character string 40 that is displayed on the display portion 4 is not moved to the left. In a case where it is determined that the second value is less than the threshold value (NO at Step S45), the CPU 401 advances the processing to Step S49.

The CPU 401 determines whether an operation is detected that selects one of the menu images 461 to 464 in the selection image 46 that is displayed on the display portion 4 (Step S49). In a case where it is determined that an operation that selects one of the menu images 461 to 464 is not detected (NO at Step S49), the CPU 401 advances the processing to Step S55. In a case where it is determined that an operation that selects one of the menu images 461 to 464 is detected (YES at Step S49), the CPU 401 performs the processing that corresponds to the selected one of the menu images 461 to 464 (Steps S51, S53), as hereinafter described. The CPU 401 then advances the processing to Step S55.

The processing at Steps S51, S53 will be explained in detail. A case in which an operation that selects the menu image 461 ("Input Symbol") is detected will be used as an example. In this case, the CPU 401 adds a symbol with the width of one character to the right of the position, in the character string 40 stored in the character string buffer, that is indicated by the second value (Step S51). The CPU 401 updates the second value, the cursor display position offset, and the starting position offset by adding 1 to each of the second value, the cursor display position offset, and the starting position offset (Step S51). The CPU 401 determines the position that is offset to the right (toward the end) from the left end (the start) of the character string 40 that is stored in the character string buffer by the amount of the updated starting position offset, then sets that position as the position within the character string 40 that is to be displayed at the left edge of the display portion 4. The CPU 401 takes characters 40A in the portion of the character string 40 that starts at the position that is set by the CPU 401 and displays those characters 40A left-justified on the display portion 4. In this case, the character string 40 that is displayed on the display portion 4 is moved one character's width to the left (Step S53). The CPU 401 displays the cursor 41 in the position that is indicated by the updated cursor display position offset (Step S53). The position of the cursor 41 that is one character's width to the left of the left edge of the selection image 46 does not change.

A case in which an operation that selects the menu image 462 ("Input Bar Code") is detected will be used as an example. In this case, the CPU 401 adds a bar code to the right of the position, in the character string 40 stored in the character string buffer, that is indicated by the second value (Step S51). The CPU 401 updates the second value, the cursor display position offset, and the starting position offset by adding a left-right length Xa of the added bar code to each of the second value, the cursor display position offset, and the starting position offset (Step S51). The CPU 401 determines the position that is offset to the right (toward the end) from the left end (the start) of the character string 40 that is stored in the character string buffer by the amount of the updated starting position offset, then sets that position as the position within the character string 40 that is to be displayed at the left edge of the display portion 4. The CPU 401 takes characters 40A in the portion of the character string 40 that starts at the position that is set by the CPU 401 and displays those characters 40A left-justified on the display portion 4. In this case, the character string 40 that is displayed on the display portion 4 is moved to the left by the width of Xa characters (Step S53). The CPU 401 displays the cursor 41 in the position that is indicated by the updated cursor display position offset (Step S53). The position of the cursor 41 that is one character's width to the left of the left edge of the selection image 46 does not change.

A case in which an operation that selects the menu image 463 ("Input Tab") is detected will be used as an example. In this case, the CPU 401 adds a tab to the right of the position, in the character string 40 stored in the character string buffer, that is indicated by the second value (Step S51). The CPU 401 updates the second value, the cursor display position offset, and the starting position offset by adding a left-right length Ya of the added tab to each of the second value, the cursor display position offset, and the starting position offset (Step S51). The CPU 401 determines the position that is offset to the right (toward the end) from the left end (the start) of the character string 40 that is stored in the character string buffer by the amount of the updated starting position offset, then sets that position as the position within the character string 40 that is to be displayed at the left edge of the display portion 4. The CPU 401 takes characters 40A in the portion of the character string 40 that starts at the position that is set by the CPU 401 and displays those characters 40A left-justified on the display portion 4. In this case, the character string 40 that is displayed on the display portion 4 is moved to the left by the width of Ya characters (Step S53). The CPU 401 displays the cursor 41 in the position that is indicated by the updated cursor display position offset (Step S53). The position of the cursor 41 that is one character's width to the left of the left edge of the selection image 46 does not change.

A case in which an operation that selects the menu image 464 ("Delete") is detected will be used as an example. In this case, the CPU 401 deletes the character to the left of the position, in the character string 40 stored in the character string buffer, that is indicated by the second value (Step S51). The CPU 401 updates the second value, the cursor display position offset, and the starting position offset by subtracting 1 from each of the second value, the cursor display position offset, and the starting position offset (Step S51). The CPU 401 determines the position that is offset to the right (toward the end) from the left end (the start) of the character string 40 that is stored in the character string buffer by the amount of the updated starting position offset, then sets that position as the position within the character string 40 that is to be displayed at the left edge of the display portion 4. The CPU 401 takes characters 40A in the portion of the character string 40 that starts at the position that is set by the CPU 401 and displays those characters 40A left-justified on the display portion 4. In this case, the character string 40 that is displayed on the display portion 4 is moved one character's width to the right (Step S53). The position of the cursor 41 that is one character's width to the left of the left edge of the selection image 46 does not change.

The CPU 401 determines whether an operation is detected that presses one of the Fn keys again (Step S55). In a case where it is determined that an operation that presses one of the Fn keys is not detected (NO at Step S55), the CPU 401 returns the processing to Step S49. The CPU 401 continues to wait for an operation that selects one of the menu images 461 to 464. In a case where it is determined that an operation that presses one of the Fn keys is detected (YES at Step S55), the CPU 401 deletes the selection image 46 that is displayed on the display portion 4 (Step S57). The CPU 401 subtracts 1 as the specified value from the first value, then subtracts the result from the second value in order to compute the second movement value. In a case where the second movement value is a negative value, the second movement value is set to zero. The CPU 401 moves the character string 40 and the cursor 41 that are displayed on the display portion 4 to the right by the amount of the computed second movement value (Step S59).

The processing at Step S59 will now be described in detail. The CPU 401 updates the starting position offset and the cursor display position offset by subtracting the second movement value from each of the starting position offset and the cursor display position offset. The CPU 401 determines the position that is offset to the right (toward the end) from the left end (the start) of the character string 40 that is stored in the character string buffer by the amount of the updated starting position offset, then sets that position as the position within the character string 40 that is to be displayed at the left edge of the display portion 4. The CPU 401 takes characters 40A in the portion of the character string 40 that starts at the position that is set by the CPU 401 and displays those characters 40A left-justified on the display portion 4 (Step S59). The CPU 401 displays the cursor 41 in the position that is indicated by the updated cursor display position offset (Step S59). The CPU 401 advances the processing to Step S61.

The CPU 401 determines whether the processing at Step S27 in the first main processing (refer to FIG. 4) is performed and printing is done (Step S61). In a case where it is determined that printing is not performed (NO at Step S61), the CPU 401 returns the processing to Step S41. The CPU 401 continues to wait for the pressing of one of the Fn keys. In a case where it is determined that printing is performed (YES at Step S61), the CPU 401 terminates the second main processing.

As explained above, in the first embodiment, the CPU 401 of the printer 1 displays the selection image 46 to the right of the center, in the left-right direction, of the display portion 4 (Step S43). In this case, the CPU 401 moves the character string 40 and the cursor 41 to the left until the cursor 41 is displayed in a position that is to the left of the left edge of the selection image 46 by the width of one character (the specified value) (Step S47). This makes it possible to prevent the cursor 41 from not being displayed due to the displaying of the selection image 46. Therefore, the user is able to edit the character string 40 while properly recognizing one of the adding position and the deleting position that is indicated by the cursor 41 within the character string 40. Moreover, by causing the printer 1 to perform the printing of the edited character string 40 on the tape (the cover film), the user can cause the printer 1 to create a label on which the edited character string 40 is printed.

In accordance with the relationship between the second value and the threshold value that is computed by subtracting 1 as the specified value from the first value, the CPU 401 determines whether the cursor 41 ceases to be displayed due to the displaying of the selection image 46 (Step S45). Therefore, the CPU 401 can easily determine whether the user is able to recognize one of the adding position and the deleting position that is indicated by the cursor 41 within the character string 40 after the selection image 46 is displayed. The CPU 401 can therefore properly determine whether it is necessary to move the character string 40 to the left.

In a case where the selection image 46 is displayed on the display portion 4, the CPU 401 moves the character string 40 and the cursor 41 to the left until the cursor 41 is displayed to the left of the left edge of the selection image 46 by the width of one character (the specified value) (Step S47). Therefore, the user is able to perform the editing of the character string 40 while easily recognizing not only the position of the cursor 41 in relation to the character string 40, but also one of the adding position (on the right side of the cursor 41) and the deleting position (on one of the left side and the right side of the cursor 41) within the character string 40.

In a case where it is determined that an operation that selects one of the menu images 461 to 464 in the selection image 46 is detected (YES at Step S49), the CPU 401 edits the character string 40 with the editing action that corresponds to the selected one of the menu images 461 to 464 (Steps SM). After doing the editing, the CPU 401 moves the character string 40 and the cursor 41 to one of the left and the right until the cursor 41 is displayed to the left of the left edge of the selection image 46 by the width of one character (the specified value) (Step S53). Thus, after the character string 40 is edited in accordance with the selecting of the one of the menu images 461 to 464, the CPU 401 is able to prevent the cursor 41 from not being displayed due to the selection image 46.

An edit screen 200 (edit screens 200A to 200D) according to a second embodiment will be explained with reference to FIG. 7. The edit screen 200A is displayed on the display portion 4 in a case where an operation is input through the keyboard 5 to start editing of a character string that is to be printed on the tape. The edit screen 200 includes a first area 50 and a second area 60. The first area 50 is the area above the center, in the up-down direction, of the display portion 4. The second area 60 is the area below the center, in the up-down direction, of the display portion 4.

The first area 50 is an area in which a print image 51 is displayed. The print image 51 is an image of a label that is to be created by printing a plurality of character strings on the cover film. The print image 51 contains three blocks 51A, 51B, 51C, which are arranged two-dimensionally. The block 51A is disposed in the center, in the left-right direction, of an upper tier of the print image 51. The block 51B is disposed on the left side of a lower tier of the print image 51. The block 51C is disposed on the right side of the lower tier of the print image 51. The blocks 51A, 51B, and 51C are horizontally extending rectangles that indicate the respective positions of the plurality of the character strings that is to be printed on the cover film. In the example that is shown in FIG. 7, the blocks 51A and 51B are rectangles that are indicated by broken lines. The block 51C is a rectangle that is indicated by solid lines. The block 51C that is indicated by the solid lines is a block that is in a state of having been selected by the user as the block that corresponds to a character string 62 that is displayed in the second area 60, which will be described below. Hereinafter, the block (the block 51C) that is indicated by the solid lines (that is, has been selected by the user) is called the selected block (the selected block 51C). "Brother indust", which is the same as the character string 62 that is shown in the second area 60, is displayed inside the selected block 51C. The blocks 51A and 51B that are indicated by the broken lines are blocks that are in a state of not having been selected by the user, that is, blocks that are other than the selected block. The character strings "Label 1-1" and "Identifier A-1", which indicate the names of the respective blocks, are displayed inside the blocks 51A and 51B, respectively.

The second area 60 is an area for editing the character string 62 that corresponds to the block that has been selected by the user, that is, the selected block 51C that is indicated by the solid lines in the first area 50. The second area 60 includes an input frame 61. The input frame 61 is a rectangle whose long axis extends horizontally. The character string 62 and a cursor 63 are displayed inside the input frame 61. The maximum number of lines of the character string 62 that can be displayed in the input frame 61 is one. The character string 62 includes a plurality of characters 62A. The plurality of the characters 62A are arrayed in the left-right direction. The maximum number of the characters 62A that can be displayed in the input frame 61 is twenty. The character string 62 is displayed left-justified. The cursor 63 is a mark that indicates the position that is being edited when the character string 62 is edited. The cursor 63 is a straight line segment that extends vertically. The vertical length of the cursor 63 is approximately equal to the vertical length of each one of the plurality of the characters 62A. The cursor 63 blinks at regular intervals. The cursor 63 is positioned to one of the left and the right of one of the plurality of the characters 62A.

In a case where a character key on the keyboard 5 is pressed, for example, the character that corresponds to the pressed character key is added to the character string 62 at the position to the right of the cursor 63 and displayed. In this case, the position to the right of the cursor 63 is specified as an adding position where the character is added. In a case where a character is added at the adding position, the cursor 63 is moved to the right side of the added character. In a case where the Delete key on the keyboard 5 is pressed, for example, the one of the plurality of the characters 62A that is to the right of the cursor 63 is deleted from the character string 62. In this case, the position to the right of the cursor 63 is specified as a deleting position where the character 62A is deleted. In a case where a character 62A is deleted by the pressing of the Delete key, the cursor 63 is not moved. In a case where the Backspace key on the keyboard 5 is pressed, for example, the one of the plurality of the characters 62A that is to the left of the cursor 63 is deleted from the character string 62. In this case, the position to the left of the cursor 63 is specified as the deleting position where the character is deleted. In a case where a character is deleted by the pressing of the Backspace key, the cursor 63 is moved to the right side of the character 62A that is positioned on the left side of the deleted character 62A. The cursor 63 therefore makes it possible for the user to recognize the position (one of the adding position and the deleting position) where the character string 62 is being edited. The cursor 63 is moved to one of the left and the right in response to the pressing of the direction keys on the keyboard 5. In a case where the character string 62 is edited as described above, the edited character string is displayed inside the corresponding selected block 51C.

As described previously, the size of the printer 1 is smaller than that of a stationary printer, and the resolution of the display portion 4 is lower. Therefore, as described previously, the number of lines of the character string 62 that can be displayed in the input frame 61 at one time and the number of the plurality of the characters 62A are restricted. Therefore, in a case where the total number of the plurality of the characters 62A in the character string 62 is greater than the maximum number of characters (twenty characters), the CPU 401 is not able to display all of the plurality of the characters 62A in the character string 62 in the input frame 61 at one time. In that case, the CPU 401 moves (scrolls) the character string 62 to the left, such that the cursor 63 is constantly displayed in the input frame 61.

The shape of the cursor 63 and the locations of the adding position and the deleting position in relation to the cursor 63 are not limited to the examples described above. For example, the shape of the cursor 63 may be a rectangle of a size that is able to cover any one of the plurality of the characters 62A. In that case, among the plurality of the characters 62A of the character string 62, the cursor 63 can be disposed to the left of the leftmost (first) character 62A, to the right of the rightmost (last) character 62A, and at the position of any one of the plurality of the characters 62A. In that case, the position of the cursor 63 may be specified as the adding position and the deleting position.

Figure 7:
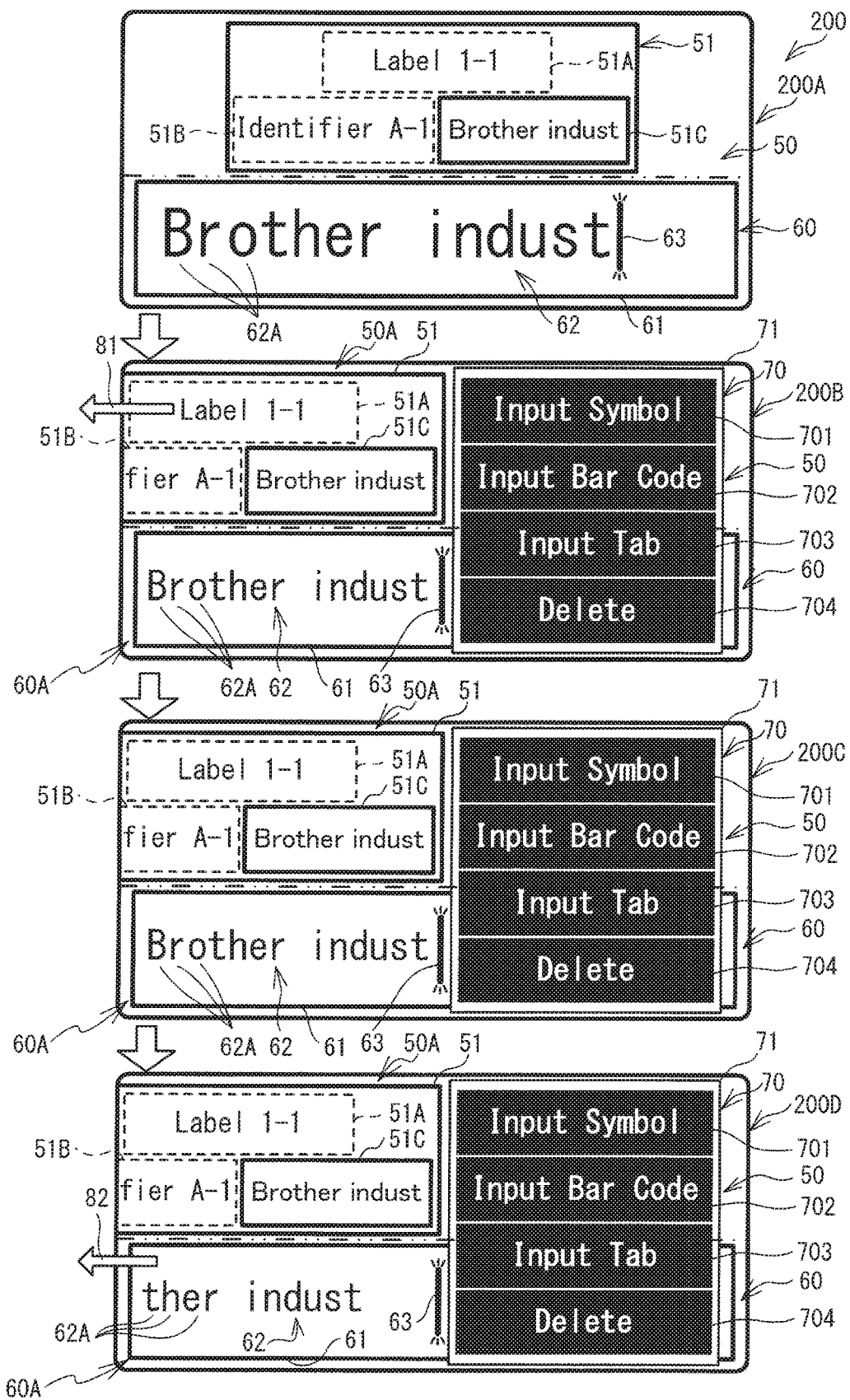
FIG. 7 is a figure that shows edit screens according to a second embodiment.

In a case where one of the Fn keys on the keyboard 5 is pressed, the edit screen 200B, an example of which is shown in FIG. 7, is displayed. In a case where one of the Fn keys is pressed, a selection image 71 is displayed on the display portion 4, to the right of the center, in the left-right direction, of the first area 50 and the second area 60. Hereinafter, the area within the first area 50 and the second area 60 where the selection image 71 is displayed is called the third area 70. The portion of the first area 50 not covered by the third area 70 is called the first residual area 50A. The portion of the second area 60 not covered by the third area 70 is called the second residual area 60A.

The overall shape of the selection image 71 is a rectangle whose long axis extends horizontally. The horizontal length of the selection image 71 is less than half of the horizontal length of the display portion 4. The left edge of the selection image 71 is positioned to the right of the center of the display portion 4. The right edge of the selection image 71 is positioned to the left of the right edge of the display portion 4. The selection image 71 is given priority for display over the print image 51 and the input frame 61. Therefore, in a case where the selection image 71 is displayed such that the print image 51 and the input frame 61 overlap with the selection image 71, priority is given to displaying the selection image 71 in the area of overlap, and the print image 51 and the input frame 61 are not displayed in that area.

The selection image 71 is partitioned into menu images 701, 702, 703, and 704, in which characters that describe the plurality of the editing actions, "Input Symbol", "Input Bar Code", "Input Tab", and "Delete", are respectively displayed. The menu images 701 to 704 are arrayed in the up-down direction. In a case where a selection operation in which the position of one of the menu images 701 to 704 in the selection image 71 is touched is detected through the touch panel 7, the CPU 401 edits the character string 62 with the corresponding editing action.

The menu image 701 ("Input Symbol") corresponds to an editing action that adds to the character string 62 a symbol that is not included on the keyboard 5. In a case where a selection operation in which the menu image 701 is touched is detected through the touch panel 7, the CPU 401 displays in the menu image 701 a list of a plurality of symbols that can be added, instead of displaying the characters "Input Symbol". In a case where a selection operation in which the position of one of the plurality of the symbols is touched is detected through the touch panel 7, the CPU 401 adds the corresponding symbol to the character string 62 in the adding position to the right of the cursor 63 and displays the symbol.

The menu image 702 ("Input Bar Code") corresponds to an editing action that adds a bar code to the character string 62. In a case where a selection operation in which the menu image 702 is touched is detected through the touch panel 7, the CPU 401 displays in the menu image 702 an input screen through which a plurality of numerals can be input, instead of displaying the characters "Input Bar Code". In a case where an operation by which a plurality of numerals have been input is detected through the keyboard 5, the CPU 401 creates a bar code that indicates the detected numerals. The CPU 401 adds the created bar code to the character string 62 in the adding position to the right of the cursor 63 and displays the bar code.

The menu image 703 ("Input Tab") corresponds to an editing action that inputs a tab. In a case where a selection operation in which the menu image 703 is touched is detected through the touch panel 7, the CPU 401 adds a tab to the character string 62 in the adding position to the right of the cursor 63 and displays the tab.

The menu image 704 ("Delete") corresponds to an editing action that deletes one of the plurality of the characters 62A from the character string 62. In a case where a selection operation in which the menu image 704 is touched is detected through the touch panel 7, the CPU 401 deletes from the character string 62 the character 62A that is in the deleting position to the left of the cursor 63. The editing action by the menu image 704 ("Delete") is the same as the editing action in a case where the Backspace key is pressed on the keyboard 5.

A menu image other than those described above may be included in the selection image 71. A scroll bar may be provided in the selection image 71, such that any one of a plurality of menu images is selectively displayed.

A case in which one of the Fn keys is pressed and the selection image 71 is displayed while the edit screen 200A is being displayed is used as an example. On the edit screen 200A, the position of the selected block 51C of the print image 51 in the first area 50 is to the right of the center, in the left-right direction, of the display portion 4. The character string 62 "Brother indust" is displayed inside the input frame 61 in the second area 60. The cursor 63 is displayed to the right of the last character 62A "t" of the character string 62. The position of the cursor 63 is to the right of the center, in the left-right direction, of the display portion 4. It is assumed that the selection image 71 is displayed while the states of the first area 50 and the second area 60 in the edit screen 200A are maintained. In that case, the selection image 71 overlaps the cursor 63 and portions of the selected block 51C and the character string 62. In that case, the cursor 63 and the overlapped portions of the selected block 51C and the character string 62 are not displayed due to the selection image 71.

In contrast, as shown in the edit screen 200B, the CPU 401 moves the print image 51 to the left (the arrow 81) to a position where the selected block 51C is not overlapped by the displayed selection image 71, or in other words, until the entire selected block 51C is positioned inside the first residual area 50A. The user is therefore able to check the position of the selected block 51C within the print image 51, as well as the character string that is displayed inside the selected block 51C, even after the selection image 71 is displayed. Furthermore, when the character string 62 is displayed left-justified inside the input frame 61, the CPU 401 reduces the character string 62 such that the cursor 63 is not overlapped by the selection image 71. Specifically, the CPU 401 first computes, by a method that will be described below, a reduction ratio that satisfies the condition that the cursor 63 is not overlapped by the selection image 71. Next, the CPU 401 reduces the character string 62 based on the computed reduction ratio. The reduced character string 62 fits within the input frame 61 in the second residual area 60A. The user is therefore able to recognize the character string 62 and the position of the cursor 63 in relation to the character string 62, even after the selection image 71 is displayed. Accordingly, by selecting one of the menu images 701 to 704 in the selection image 71, the user can easily perform editing of the character string 62 while looking at the selected block 51C and the character string 62 inside the input frame 61.

A case in which an operation that selects the menu image 703 ("Input Tab") in the selection image 71 is performed while the edit screen 200B is being displayed is used as an example. In this case, the CPU 401 first adds a tab to the character string 62 inside the input frame 61 in the adding position, then moves the cursor 63 to the right side of the added tab. Next, as shown in the edit screen 200C, when the character string 62 to which the tab is added is displayed left-justified inside the input frame 61, the CPU 401 computes a reduction ratio such that the cursor 63 is not be overlapped by the selection image 71, then reduces the character string 62 further. The reduced character string 62 is displayed inside the input frame 61 in the second residual area 60A. The user is therefore able to continue checking the position of the cursor 63 in relation to the character string 62, even after the menu image 703 in the selection image 71 is selected and the character string 62 is edited. In cases in which operations that select the menu image 701 ("Input Symbol") and the menu image 702 ("Input Bar Code") are performed, the CPU 401 also computes a reduction ratio such that the cursor 63 is not overlapped by the selection image 71, then reduces the character string 62 further when the edited character string 62 is displayed left-justified inside the input frame 61 in the second residual area 60A, although these cases will not be explained in detail. The user is therefore able to continue recognizing the character string 62 and the cursor 63, even after the character string 62 is edited in accordance with an editing action that corresponds to one of the menu images 701 to 703.

The method for displaying the print image 51 is not specifically limited. For example, the CPU 401 may reduce the character string such that the entire character string edited in accordance with an operation that selects one of the menu images 701 to 703 in the selection image 71 fits inside the selected block 51C. The CPU 401 may, for example, extend the left-right length of the selected block 51C such that the entire character string edited in accordance with an operation that selects one of the menu images 701 to 703 in the selection image 71 fits inside the selected block 51C. In a case where the CPU 401 extends the left-right length of the selected block 51C, the CPU 401 may move the print image 51 to the left until the selected block 51C is not overlapped by the selection image 71.

A case in which an operation that selects the menu image 704 ("Delete") in the selection image 71 is performed while the edit screen 200C is being displayed is used as an example. In this case, the CPU 401 first deletes the tab in the deleting position to the left of the cursor 63 in the character string 62, then moves the cursor 63 to the right side of the character 62A "t" that was to the left of the deleted tab. Next, the CPU 401 restores to its original, pre-reduction size the character string 62 that was reduced when the tab was added by the selecting of the menu image 703 ("Input Tab"). That causes the edit screen 200C to revert to the edit screen 200B.

In contrast, a case in which an operation that selects the menu image 703 ("Input Tab") in the selection image 71 is performed again while the edit screen 200C is being displayed is used as an example. In this case, the CPU 401 first adds a tab to the character string 62 inside the input frame 61 in the adding position, then moves the cursor 63 to the right side of the added tab. Next, when the character string 62 to which the tab has been added is displayed left-justified inside the input frame 61, the CPU 401 computes a reduction ratio such that the cursor 63 is not overlapped by the selection image 71. At this point, if the computed reduction ratio is less than a specified reduction ratio (a threshold value T, described below), the CPU 401 reduces the character string 62 by the specified reduction ratio. In this case, the specified reduction ratio is greater than the computed reduction ratio. Therefore, in a case where the reduced character string 62 is displayed left-justified in the input frame 61, the cursor 63 and the selection image 71 overlaps. In that case, the selection image 71 prevents the cursor 63 from being displayed.

Accordingly, as shown in the edit screen 200D, the CPU 401 moves the cursor 63 and the character string 62 that has been reduced by the specified reduction ratio to the left (the arrow 82) until the cursor 63 is disposed at a position that is to the left of the left edge of the displayed selection image 71, or in other words, until the cursor 63 is disposed inside the input frame 61 in the second residual area 60A. This makes it possible for the user to continue checking the position of the cursor 63 in relation to the character string 62, even after the menu image 703 in the selection image 71 is selected and the character string 62 is edited. The reduced character string 62 and the cursor 63 are displayed in the input frame 61 at the specified reduction ratio. It is therefore possible to inhibit the character string 62 from being made hard to see due to its being reduced.

In a case where one of the Fn keys is pressed again while one of the edit screens 200B to 200D is being displayed, the selection image 71 is deleted, and the edit screen 200 reverts to the original edit screen 200A. Furthermore, in a case where the Print key on the keyboard 5 is pressed while one of the edit screens 200A to 200D is being displayed, the CPU 401 generates the printing data for printing the print image 51 on the cover film. The CPU 401 creates a label by printing the print image 51 on the cover film based on the generated printing data.

The specific processing that the CPU 401 performs in the second embodiment in order to implement an editing operation on the character string 62 that are described above will be explained. Programs for third main processing (refer to FIG. 8) and fourth main processing (refer to FIGS. 9 and 10) are stored in the ROM 402. The third main processing and the fourth main processing are started by the CPU 401's executing of the programs that are stored in the ROM 402 when an operation for starting the editing of the character string 62 is performed through the keyboard 5. The third main processing corresponds to the editing processing of the character string 62 that is performed when a character key on the keyboard 5 is pressed. The fourth main processing corresponds to the editing processing of the character string 62 that is performed when one of the menu images 701 to 704 (refer to FIG. 7) in the selection image 71 is selected. The third main processing and the fourth main processing are performed in parallel.

In the second embodiment, the plurality of the characters 62A in the character string 62 that is displayed in the input frame 61 are all full-width characters of a specified font size (hereinafter called the initial size P) and are displayed at a size that is 5 millimeters wide, for example.

Variables (a first character count and a second character count) that are used in the third main processing and the fourth main processing will be explained. The first character count indicates the number of characters of the initial size P that can be displayed in the input frame 61 while the selection image 71 is not being displayed. The second character count indicates the number of characters of the initial size P that can be displayed in the portion of the input frame 61 that is not overlapped by the selection image 71, or in other words, in the input frame 61 in the second residual area 60A, while the selection image 71 is being displayed. The first character count and the second character count are stored in the ROM 402.

A first buffer, a second buffer, a first cursor position offset, and a second cursor position offset that are used when the third main processing and the fourth main processing are performed by the CPU 401 will be explained. The plurality of the characters 62A of the character string 62 (refer to FIG. 7) are stored in order in the first buffer in response to one of the pressing of a character key on the keyboard 5 and the selecting of one of the menu images 701 to 704 in the selection image 71. The plurality of the characters 62A include a symbol, a bar code, and a tab. Among the plurality of the characters 62A in the character string 62 that is stored in the first buffer, the plurality of the characters 62A that are displayed in the input frame 61 are stored in the second buffer. The first cursor position offset indicates the length of the interval from the left edge (the start) of the character string 62 to the position of the cursor 63 in terms of a number of characters. The second cursor position offset indicates the display position of the cursor 63 in terms of the number of characters from the left edge of the input frame 61 to the position of the cursor 63. The first buffer, the second buffer, the first cursor position offset, and the second cursor position offset are stored in the RAM 404. When the CPU 401 starts the third main processing and the fourth main processing, the CPU 401 initializes the first buffer, the second buffer, the first cursor position offset, and the second cursor position offset by setting each of the first buffer, the second buffer, the first cursor position offset, and the second cursor position offset to zero.

Figure 8:
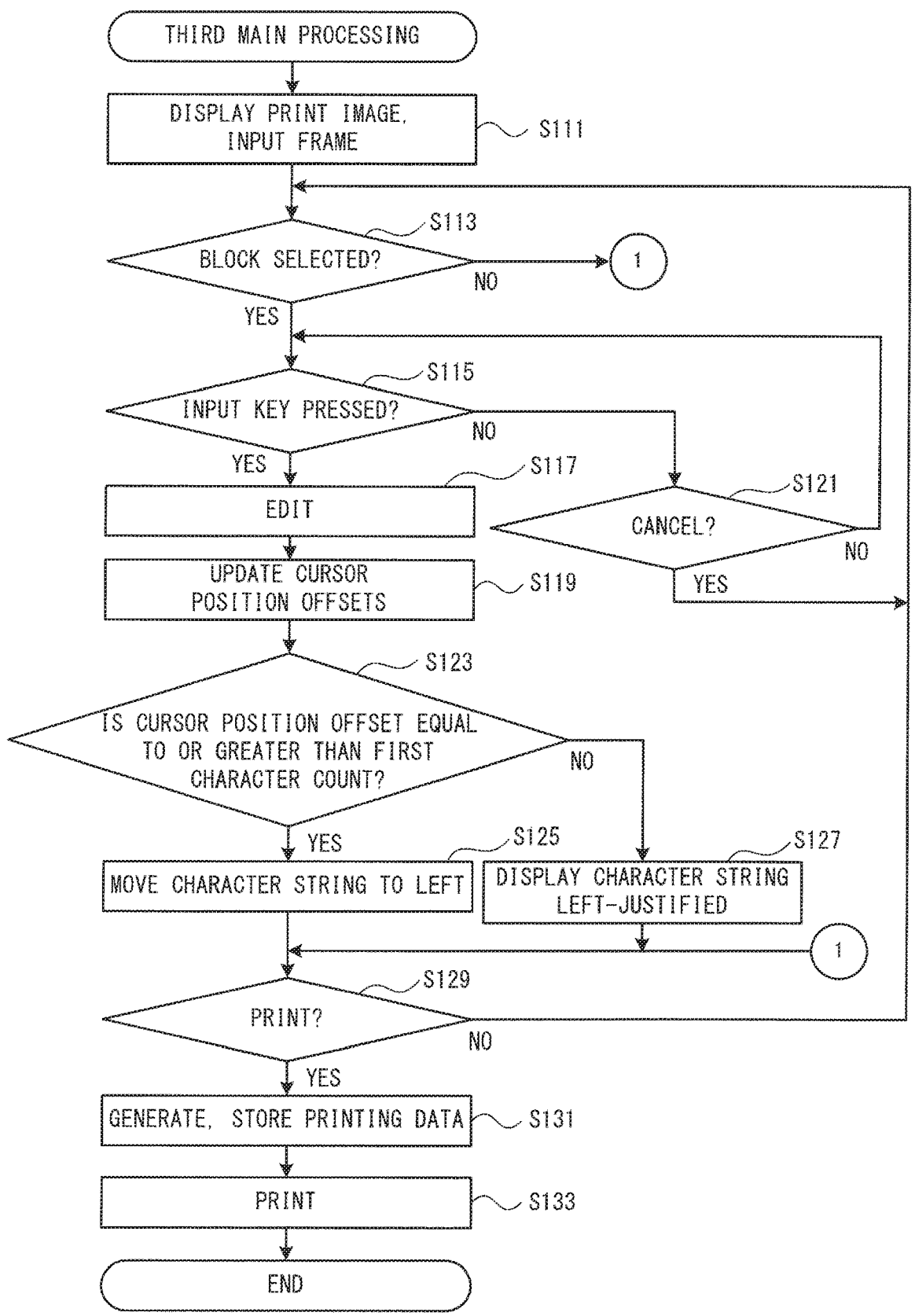
FIG. 8 is a flowchart of third main processing.

The third main processing will be explained with reference to FIG. 8. The CPU 401 displays the print image 51 (refer to FIG. 7) in the first area 50 of the display portion 4 and displays the input frame 61 (refer to FIG. 7) in the second area 60 (Step S111). The CPU 401 determines whether a selection operation in which the position of one of the blocks 51A to 51C in the displayed print image 51 is touched is detected through the touch panel 7 (Step S113). In a case where it is determined that a selection operation is not detected (NO at Step S113), the CPU 401 advances the processing to Step S129.

In a case where it is determined that a selection operation is detected (YES at Step S113), the CPU 401 takes the block that has been selected (for example, the block 51C) and stores the block in the RAM 404 as the selected block (the selected block 51C). The CPU 401 changes the broken line rectangle that indicates the selected block 51C to a solid line rectangle. The CPU 401 determines whether the CPU 401 detects an operation that presses an input key (one of a character key, a direction key, the Delete key, and the Backspace key) on the keyboard 5 (Step S115). In a case where it is determined that an operation that presses an input key is not detected (NO at Step S115), the CPU 401 determines whether an operation is detected through the touch panel 7 in which the block 51C detected at Step S113 is pressed again (Step S121). In a case where it is determined that an operation in which the block 51C is pressed is not detected (NO at Step S121), the CPU 401 returns the processing to Step S115. In a case where it is determined that an operation in which the block 51C is pressed is detected (YES at Step S121), the CPU 401 takes the selected block 51C that is indicated by a solid line rectangle and changes the selected block 51C back to the original broken line rectangle. The selecting of the block is thus canceled. The CPU 401 returns the processing to Step S113.

In a case where it is determined that an operation that presses an input key is detected (YES at Step S115), the CPU 401 performs the editing action that corresponds to the pressed input key, performing the editing action at a position in the first buffer that is to one of the left and the right of the position that is indicated by the first cursor position offset (Step S117). In a case where the CPU 401 performs the adding of a character 62A, the CPU 401 updates the first cursor position offset and the second cursor position offset by adding 1 to each of the first cursor position offset and the second cursor position offset in order to move the cursor 63 one character's width to the right (Step S119). In a case where the CPU 401 performs the deleting of a character 62A according to the pressing of the Backspace key, the CPU 401 updates the first cursor position offset and the second cursor position offset by subtracting 1 from each of the first cursor position offset and the second cursor position offset in order to move the cursor 63 one character's width to the left (Step S119).

For example, in a state in which the plurality of the characters 62A "B", "r", "o", "t", "h", and "e" of the character string 62 "Brothe" are stored in the first buffer and the first cursor position offset and the second cursor position offset are both 6 (to the right of "e"), it is assumed that the CPU 401 detects that the input key "r" is pressed. In this case, the character 62A "r" is stored in the first buffer, changing the character string 62 to "Brother". The CPU 401 adds 1 to both the first cursor position offset and the second cursor position offset, updating the first cursor position offset and the second cursor position offset from 6 to 7. In this state, in a case where the CPU 401 detects that the Backspace key is pressed, for example, the CPU 401 deletes the character 62A "r" from the first buffer, changing the character string 62 to "Brothe". The CPU 401 subtracts 1 from both the first cursor position offset and the second cursor position offset, updating the first cursor position offset and the second cursor position offset from 7 to 6.

The CPU 401 determines whether the first cursor position offset is equal to or greater than the first character count (Step S123). It is assumed that, in a case where the first cursor position offset is equal to or greater than the first character count, the entire character string 62 is displayed in the input frame 61, starting from its left end (the start). In that case, the position of the cursor 63 is located to the right of the right edge of the input frame 61. In a case where it is determined that the first cursor position offset is equal to or greater than the first character count (YES at Step S123), the CPU 401 looks at the characters 62A in the character string 62 that is stored in the first buffer, and starting at the character 62A that is offset from the left end of the character string 62 by the amount of the first cursor position offset, counts back toward the left end (the start) of the character string 62 by a number of the characters 62A that is equal to the first character count, then stores those characters 62A in the second buffer. The CPU 401 displays left-justified in the input frame 61 the characters 62A that are stored in the second buffer (Step S125). The CPU 401 updates the second cursor position offset by setting the second cursor position offset to the value of the first character count, then displays the cursor 63 at the position that is indicated by the second cursor position offset (Step S125). The cursor 63 is displayed at the right edge of the input frame 61. The CPU 401 displays the character string 62 that is stored in the first buffer in the selected block 51C of the print image 51 that is displayed in the first area 50. The CPU 401 advances the processing to Step S129.

In contrast, it is assumed that the entire character string 62 is displayed in the input frame 61, starting from its left end (the start), in a case where the first cursor position offset is less than the first character count. In that case, the position of the cursor 63 is to the left of the right edge of the input frame 61. In a case where it is determined that the first cursor position offset is less than the first character count (NO at Step S123), the CPU 401 stores in the second buffer a number of the characters 62A that is equal to the maximum first character count, the characters 62A being counted from the start of the character string 62 that is stored in the first buffer. The CPU 401 displays left-justified in the input frame 61 the characters 62A that are stored in the second buffer (Step S127). In this way, the character string 62 that is stored in the first buffer is displayed left-justified in the input frame 61, starting from the beginning of the character string 62. The CPU 401 displays the cursor 63 in the position that is indicated by the second cursor position offset (Step S127). The CPU 401 displays the character string 62 that is stored in the first buffer in the selected block 51C of the print image 51 that is displayed in the first area 50. The CPU 401 advances the processing to Step S129.

The CPU 401 determines whether the CPU 401 detects an operation that presses the Print key on the keyboard 5 (Step S129). In a case where it is determined that an operation that presses the Print key is not detected (NO at Step S129), the CPU 401 returns the processing to Step S113. The CPU 401 continues to wait for the pressing of an input key. In a case where it is determined that an operation that presses the Print key on the keyboard 5 is detected (YES at Step S129), the CPU 401 generates the printing data for printing the character string 62 that is stored in the first buffer on the cover film, then stores the printing data in the flash ROM 405 (Step S131). Based on the printing data that are stored in the flash ROM 405, the CPU 401 prints the character string 62 on the cover film (Step S133). The CPU 401 creates a label by sticking the base material tape onto the printed cover film. The CPU 401 then terminates the third main processing.

The fourth main processing will be explained with reference to FIG. 9. The CPU 401 determines whether the CPU 401 detects an operation that presses one of the Fn keys (Step S141). In a case where it is determined that an operation that presses one of the Fn keys is not detected (NO at Step S141), the CPU 401 returns the processing to Step S141. The CPU 401 continues to wait for the pressing of one of the Fn keys. In a case where it is determined that an operation that presses one of the Fn keys is detected (YES at Step S141), the CPU 401 displays the selection image 71 in the third area 70 (Step S143). The CPU 401 advances the processing to Step S145.

The CPU 401 determines whether the displayed selection image 71 overlaps the selected block 51C of the print image 51 that is displayed in the first area 50 (Step S145). In a case where it is determined that the selection image 71 does not overlap the selected block 51C (NO at Step S145), the CPU 401 advances the processing to Step S149.

In a case where it is determined that the selection image 71 does overlap the selected block 51C (YES at Step S145), the CPU 401 moves the print image 51 to the left such that the selected block 51C is not overlapped by the selection image 71 (Step S147). Specifically, the CPU 401 moves the print image 51 to the left until the entire selected block 51C is disposed in an area within the first area 50 that is not overlapped by the third area 70 where the selection image 71 is displayed, that is, in the first residual area 50A (Step S147). The CPU 401 displays the moved print image 51 (Step S148). The CPU 401 advances the processing to Step S149.

The CPU 401 determines whether the second cursor position offset is greater than the second character count. It is assumed that, in a case where the second cursor position offset is greater than the second character count, the selection image 71 is displayed in the third area 70 while the entire character string 62 that is stored in the second buffer is being displayed in the input frame 61. In that case, the cursor 63 is overlapped by the selection image 71. Therefore, the user cannot check the position of the cursor 63.

In a case where it is determined that the second cursor position offset is greater than the second character count (YES at Step S149), the CPU 401 computes a reduction ratio S (Step S151). The reduction ratio S is a parameter by which the font size is multiplied in order to reduce the size of the characters 62A from the start of the character string 62 that is stored in the second buffer to the position of the cursor 63. Specifically, the CPU 401 computes the reduction ratio S by dividing the second character count by the second cursor position offset. The computed reduction ratio S is multiplied times a length L1 in order to make the length L1 no greater than a length L2, the length L1 being the horizontal length from the start of the character string 62 that is stored in the second buffer to the position of the cursor 63 when the characters are displayed at the initial size P, and the length L2 being the horizontal length when a number of characters that is equal to the second character count are displayed at the initial size P.

The CPU 401 stores the computed reduction ratio S in the RAM 404. In a case where the second cursor position offset is 18 and the second character count is 15, for example, the reduction ratio S is computed as 15/18=0.83. The CPU 401 determines whether the computed reduction ratio S is less than the specified threshold value T (for example, 0.75) (Step S153). In a case where it is determined that the reduction ratio S is not less than the specified threshold value T (NO at Step S153), the CPU 401 changes (reduces) the font size of the characters 62A of the character string 62 that is stored in the second buffer to the size that is computed by multiplying the initial size P by the reduction ratio S (Step S157). The CPU 401 displays left-justified in the input frame 61 the character string 62 in which the font size of the characters 62A is reduced based on the reduction ratio S (Step S158). The CPU 401 displays the cursor 63 in the position that is indicated by the second cursor position offset (Step S158). The CPU 401 advances the processing to Step S161 (refer to FIG. 10). When the processing that is described above is performed, the cursor 63 is displayed in the input frame 61 at a position that is close to the selection image 71. The user is therefore able to check the position of the cursor 63 in relation to the character string 62.

In a case where it is determined that the reduction ratio S is less than the specified threshold value T (YES at Step S153), the CPU 401 changes (reduces) the font size of the characters 62A of the character string 62 that is stored in the second buffer to the size that is computed by multiplying the initial size P by the threshold value T (for example, 0.75) (Step S155). The CPU 401 computes an offset count C. The offset count C is the number of the characters 62A that are overlapped by the selection image 71 when the character string 62 reduced based on the threshold value T is displayed left-justified in the input frame 61. The CPU 401 displays the character string 62 reduced based on the threshold value T left-justified in the input frame 61, starting from the character 62A that is offset from the start of the character string 62 by the offset count C (Step S156). The CPU 401 updates the second cursor position offset by subtracting the offset count C from the second cursor position offset, then displays the cursor 63 in the position that is indicated by the updated second cursor position offset (Step S156). Thus, in a case where the left-right length from the start of the character string 62 reduced based on the threshold value T to the position of the cursor 63 does not fit inside the input frame 61 in the second residual area 60A, the CPU 401 is able to shift the reduced character string 62 to the left by number of characters that is indicated by the offset count C and to display the shifted character string 62 in the input frame 61. The CPU 401 advances the processing to Step S161 (refer to FIG. 10). When the processing that is described above is performed, the cursor 63 is displayed in the input frame 61 at a position that is close to the selection image 71. The user is therefore able to check the position of the cursor 63 in relation to the character string 62.

Figure 10:
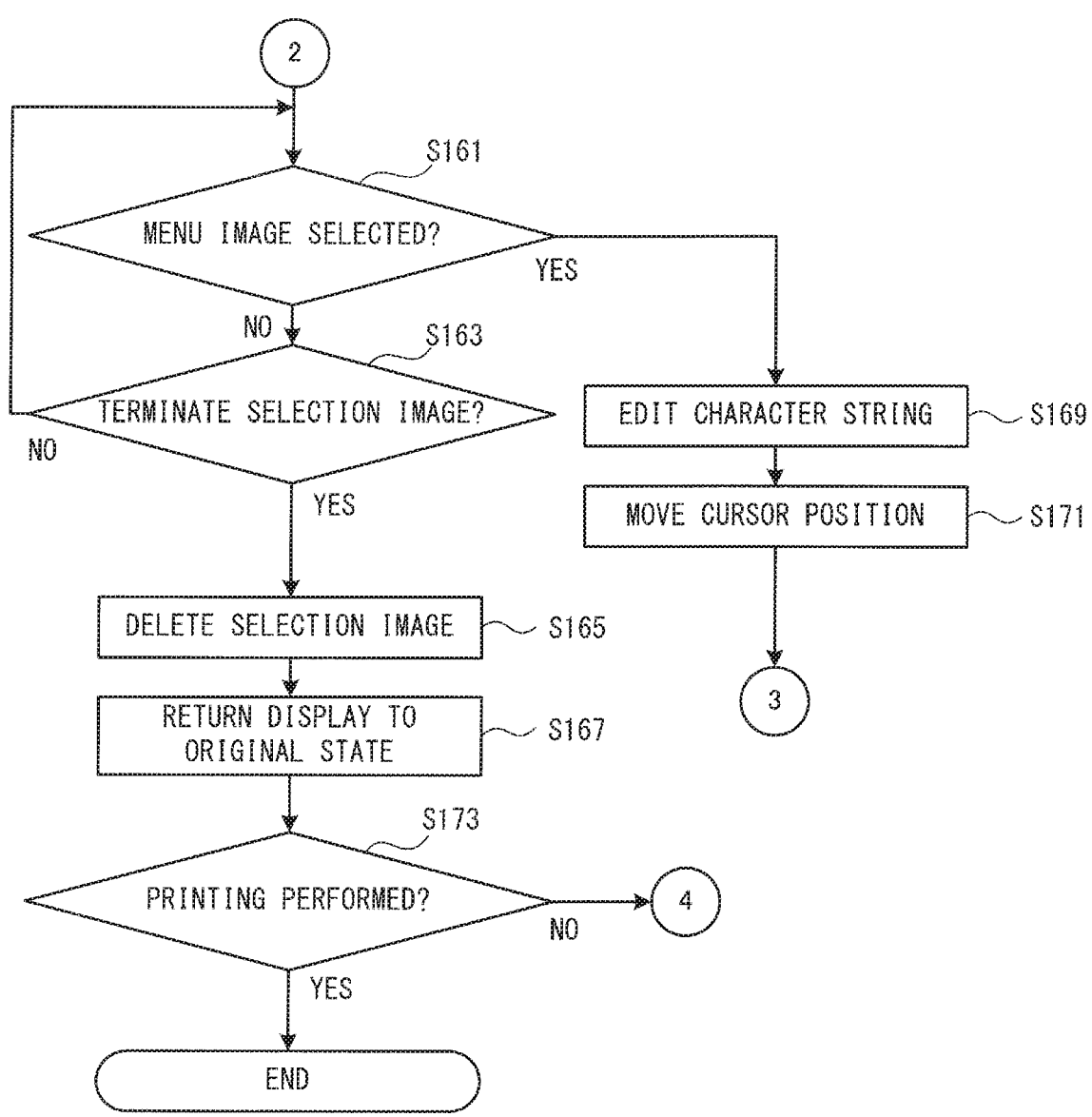
FIG. 10 is a flowchart of the fourth main processing, continuing from FIG. 9.

As shown in FIG. 10, the CPU 401 determines whether an operation is detected that selects one of the menu images 701 to 704 in the selection image 71 that is displayed on the display portion 4 (Step S161). In a case where it is determined that an operation that selects one of the menu images 701 to 704 is detected (YES at Step S161), the CPU 401 performs the processing that corresponds to the selected one of the menu images 701 to 704 (Steps S169, S171), as hereinafter described.

The processing at Steps S169, S171 will be explained in detail. In a case where an operation that selects the menu image 701 ("Input Symbol") is detected, the CPU 401 adds a symbol with the width of one character to the right of the position, in the character string 62 stored in the first buffer, that is indicated by the first cursor position offset. The CPU 401 also adds a symbol with the width of one character to the right of the position, in the character string 62 stored in the second buffer, that is indicated by the second cursor position offset (Step S169). The CPU 401 updates the first cursor position offset and the second cursor position offset by adding 1 to each of the first cursor position offset and the second cursor position offset (Step S171). In a case where an operation that selects the menu image 702 ("Input Bar Code") is detected, the CPU 401 adds a bar code to the right of the position, in the character string 62 stored in the first buffer, that is indicated by the first cursor position offset. The CPU 401 also adds a bar code to the right of the position, in the character string 62 stored in the second buffer, that is indicated by the second cursor position offset (Step S169). The CPU 401 updates the first cursor position offset and the second cursor position offset by adding a left-right length Xb of the added bar code to each of the first cursor position offset and the second cursor position offset (Step S171). In a case where an operation that selects the menu image 703 ("Input Tab") is detected, the CPU 401 adds a tab to the right of the position, in the character string 62 stored in the first buffer, that is indicated by the first cursor position offset. The CPU 401 also adds a tab to the right of the position, in the character string 62 stored in the second buffer, that is indicated by the second cursor position offset (Step S169). The CPU 401 updates the first cursor position offset and the second cursor position offset by adding a left-right length Yb of the added tab to each of the first cursor position offset and the second cursor position offset (Step S171). In a case where an operation that selects the menu image 704 ("Delete") is detected, the CPU 401 deletes the character to the left of the position, in the character string 62 stored in the first buffer, that is indicated by the first cursor position offset. The CPU 401 also deletes the character to the left of the position, in the character string 62 stored in the second buffer, that is indicated by the second cursor position offset (Step S169). The CPU 401 updates the first cursor position offset and the second cursor position offset by subtracting 1 from each of the first cursor position offset and the second cursor position offset (Step S171).

Figure 9:
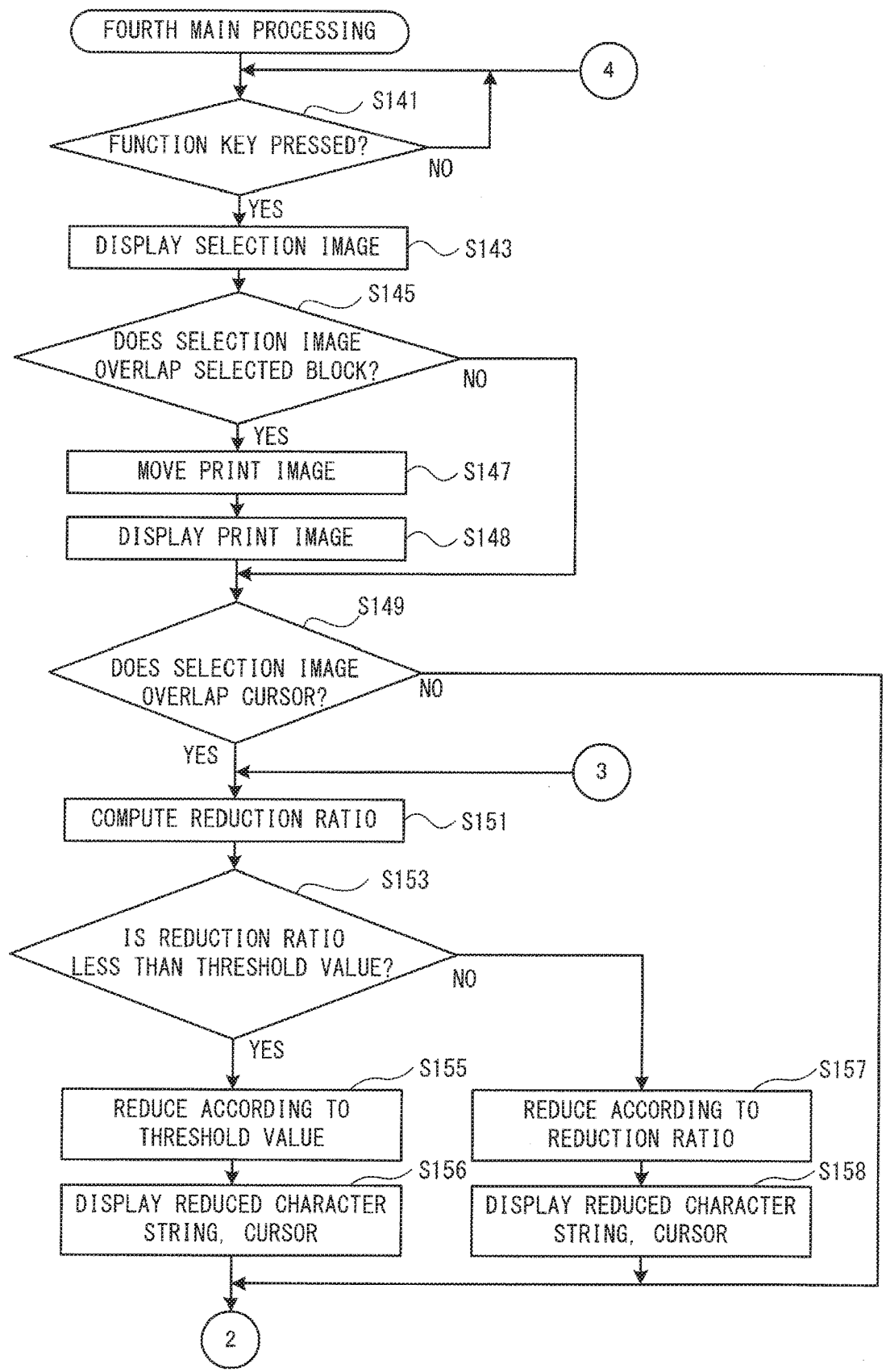
FIG. 9 is a flowchart of fourth main processing.

The CPU 401 returns the processing to Step S151 (refer to FIG. 9). Based on the second cursor position offset, the CPU 401 computes the reduction ratio S by the same method as that described above (Step S151). Based on the computed reduction ratio S, the CPU 401 reduces the characters 62A of the character string 62 that is stored in the second buffer (Steps S155, S157), then displays the character string 62 in the input frame 61 (Steps S156, S158).

A specific example will be explained. A case in which an operation that selects the menu image 703 ("Input Tab") is detected at a time when the second cursor position offset is 18 and the second character count is 15 is used as an example. The left-right length Yb of the added tab is 2. The threshold value T is 0.75. The first cursor position offset and the second cursor position offset are updated by adding 2 to each of the first cursor position offset and the second cursor position offset, such that the second cursor position offset is updated to 20. In this case, the reduction ratio S is computed as 15/20=0.75. The computed reduction ratio S is not less than the threshold value T. Therefore, the CPU 401 changes (reduces) the font size of the characters 62A of the character string 62 that is stored in the second buffer to the size that is computed by multiplying the initial size P by the reduction ratio S (Step S157). The character string 62 reduced based on the reduction ratio S is displayed left-justified in the input frame 61, along with the cursor 63 (Step S158).

A case in which an operation that selects the menu image 703 ("Input Tab") is detected again is used as an example. The first cursor position offset and the second cursor position offset are updated by adding 2 to each of the first cursor position offset and the second cursor position offset, such that the second cursor position offset is updated to 22. In this case, the reduction ratio S is computed as 15/22=0.68. The computed reduction ratio S is less than the threshold value T. Therefore, the font size of the characters 62A of the character string 62 that is stored in the second buffer is changed (reduced) to the size that is computed by multiplying the initial size P by the threshold value T (Step S155). The offset count C is set to the number of the characters 62A that are overlapped by the selection image 71 when the character string 62 reduced based on the threshold value T is displayed left-justified in the input frame 61. The character string 62 reduced based on the threshold value T is displayed left-justified in the input frame 61, starting from the character 62A that is offset from the start of the character string 62 by the offset count C (Step S156). The cursor 63 is displayed in the position that is indicated by the updated second cursor position offset (Step S156). Thus, in a case where the left-right length from the start of the character string 62 reduced based on the threshold value T to the position of the cursor 63 does not fit inside the input frame 61 in the second residual area 60A, the CPU 401 is able to shift the reduced character string 62 to the left by number of characters that is indicated by the offset count C and to display the shifted character string 62 in the input frame 61. In this case, the characters 62A of the reduced character string 62 that precede the character 62A that is offset from the start of the character string 62 by the offset count C are not displayed in the input frame 61.

As shown in FIG. 10, in a case where it is determined that an operation that selects one of the menu images 701 to 704 is not detected (NO at Step S161), the CPU 401 determines whether an operation is detected that presses one of the Fn keys (Step S163). In a case where it is determined that an operation that presses one of the Fn keys is not detected (NO at Step S163), the CPU 401 returns the processing to Step S161. The CPU 401 continues to wait for an operation that selects one of the menu images 701 to 704. In a case where it is determined that an operation that presses one of the Fn keys is detected (YES at Step S163), the CPU 401 deletes the selection image 71 that is displayed in the third area 70 (Step S165).

In a case where the print image 51 has been moved to the left by the processing at Step S147 (refer to FIG. 9), the CPU 401 moves the print image 51 to the right, returning the print image 51 to its original position (Step S167). The CPU 401 displays in the first area 50 the print image 51 returned to its original position (Step S167).

In a case where the font size of the character string 62 has been reduced by the processing at Steps S155, S157, the CPU 401 returns the font size of the character string 62 to the original initial size P (Step S167). In a case where the first cursor position offset is not less than the first character count, the CPU 401 copies into the second buffer, from the character string 62 that is stored in the first buffer, a number of characters that is equal to the first character count, counting to the left from the character at the position that is indicated by the first cursor position offset. The CPU 401 displays left-justified in the input frame 61 the characters 62A that are stored in the second buffer (Step S167). The CPU 401 updates the second cursor position offset and displays the cursor 63 at the position that is indicated by the updated second cursor position offset (Step S167). In contrast, in a case where the first cursor position offset is less than the first character count, the CPU 401 copies into the second buffer, from the character string 62 that is stored in the first buffer, all of the characters to the left of the character at the position that is indicated by the first cursor position offset. The CPU 401 displays left-justified in the input frame 61 the characters 62A that are stored in the second buffer (Step S167).

The CPU 401 determines whether the processing at Step S133 in the third main processing (refer to FIG. 9) is performed and printing is done (Step S173). In a case where it is determined that printing is not performed (NO at Step S173), the CPU 401 returns the processing to Step S141 (refer to FIG. 9). The CPU 401 continues to wait for the pressing of one of the Fn keys. In a case where it is determined that printing is performed (YES at Step S173), the CPU 401 terminates the fourth main processing.

As explained above, in the second embodiment, the CPU 401 of the printer 1 displays the selection image 71 in response to the pressing of one of the Fn keys on the keyboard 5. In this case, the CPU 401 determines whether the selection image 71 overlaps the selected block 51C selected by the user from among the blocks 51A to 51C in the print image 51 (Step S145). In a case where it is determined that the selection image 71 overlaps the selected block 51C (YES at Step S145), the CPU 401 moves the print image 51 to the left such that the entire block 51C is disposed in the first residual area 50A (Step S147), then displays the print image 51 (Step S148). It is thus possible to inhibit the selection image 71 from overlapping the selected block 51C such that at least a portion of the selected block 51C is not displayed. The user is therefore able to perform editing of the character string 62 while checking the entire selected block 51C in the print image 51. Therefore, the editing of the character string 62 can be performed appropriately.

The CPU 401 determines whether the selection image 71 overlaps the cursor 63 when the selection image 71 is displayed in response to the pressing of one of the Fn keys on the keyboard 5 (Step S149). In a case where it is determined that the selection image 71 overlaps the cursor 63 (YES at Step S149), the CPU 401 reduces the character string 62 such that the character string 62 can fit into the input frame 61 in the second residual area 60A (Steps S155, S157). The CPU 401 displays the reduced character string 62 and the cursor 63 in the input frame 61 in the second residual area 60A (Steps S156, S158). It is thus possible to inhibit the selection image 71 from overlapping the cursor 63 such that the cursor 63 is not displayed. The user is therefore able to perform editing of the character string 62 while using the cursor 63 to check the position where the character string 62 is to be edited. Therefore, the user is able to perform the editing of the character string 62 appropriately.

The CPU 401 compares the computed reduction ratio S to the threshold value T (Step S153). In a case where the reduction ratio S is less than the specified threshold value T (YES at Step S153), the CPU 401 reduces the character string 62 using the threshold value T instead of the reduction ratio S (Step S155). The CPU 401 is thus able to inhibit the character string 62 from being reduced by a reduction ratio S that is less than the threshold value T. Therefore, the CPU 401 is able to inhibit the visibility of the character string 62 from being impaired by the displaying in the input frame 61 of the character string 62 reduced by a reduction ratio S that is less than the threshold value T. The CPU 401 is therefore able to maintain the visibility of the character string 62 to be edited while the character string 62 is displayed in the input frame 61.

In a case where the reduction ratio S is less than the threshold value T (YES at Step S153), the CPU 401 reduces the character string 62 using the threshold value T (Step S155). In this case, if the horizontal (left-right) length from the start of the reduced character string 62 to the position of the cursor 63 does not fit inside the input frame 61 in the second residual area 60A, the CPU 401 is able to shift the reduced character string 62 and the cursor 63 to the left by number of characters that is indicated by the offset count C and to display the shifted character string 62 and cursor 63 in the input frame 61. Thus, even in a case where the character string 62 is reduced using the threshold value T, the user is able to perform editing of the character string 62 while using the cursor 63 to check the position where the character string 62 is to be edited.

In a case where it is determined that a selection operation is detected that touches one of the menu images 701 to 704 in the selection image 71 (YES at Step S161), the CPU 401 uses the corresponding editing action to edit the character string 62 (Step S169). The CPU 401 moves the cursor 63 in accordance with the editing action (Step S171). The CPU 401 computes the reduction ratio S based on the position of the moved cursor 63 (Step S151). Thus the CPU 401 is able to inhibit the overlapping of the cursor 63 by the selection image 71, even after the editing of the character string 62 is performed according to the selection image 71. The user is therefore able to perform editing of the character string 62 while using the cursor 63 to check the position where the character string 62 is to be edited, even after the character string 62 is edited in accordance with an operation that touches one of the menu images 701 to 704. Therefore, the user is able to perform the editing of the character string 62 even more appropriately.

Figure 6:
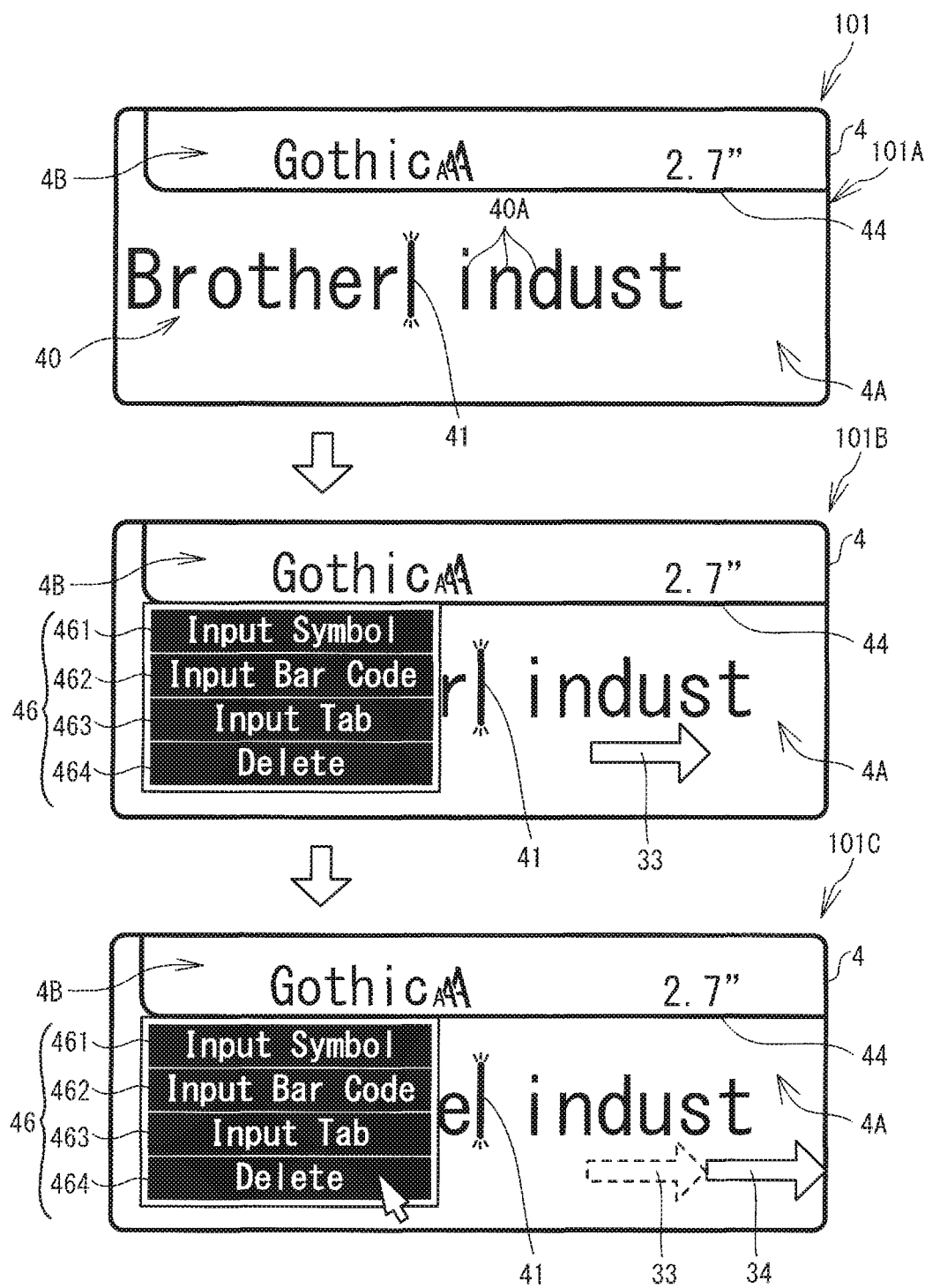
FIG. 6 is a figure that shows edit screens in a modified example of the first embodiment.

Various types of modifications can be made to the embodiments that are described above. In the first embodiment, the CPU 401 displays the selection image 46 to the right of the center, in the left-right direction, of the display portion 4. The CPU 401 may display the selection image 46 to the left of the center, in the left-right direction, of the display portion 4. This will be explained in detail with reference to FIG. 6. On an edit screen 101A, the character string 40 "brother indust" is displayed on the display portion 4, and the cursor 41 is displayed to the right of the character 40A "r", which is the last character of "brother" in the character string 40. A case in which one of the Fn keys is pressed at this time is used as an example. Unlike in the first embodiment, the selection image 46 is displayed on the display portion 4 inside the first display area 4A, to the left of the center, in the left-right direction, of the display portion 4, as shown on an edit screen 101B. It is assumed that the selection image 46 is displayed while the left-right position of the character string 40 is maintained. In that case, the selection image 46 is displayed in a position where the selection image 46 overlaps the position of the cursor 41 on the edit screen 101A.

In this sort of case, the CPU 401 moves the character string 40 to the right (the arrow 33) until the cursor 41 is disposed in a position where the cursor 41 is not overlapped by the displayed selection image 46, or more specifically, a position that is one character's width to the right of the right edge of the selection image 46. Therefore, even after the selection image 46 is displayed, the user is able to check the position of the cursor 41 in relation to the character string 40, as well as one of the adding position (the space to the right of the cursor 41) and the deleting position (one of the space to the right of the cursor 41 and the character 40A "r" to the left of the cursor 41) that is indicated by the cursor 41.

A case in which an operation that selects the menu image 464 ("Delete") in the selection image 46 is performed while the edit screen 101B is being displayed is used as an example. In this case, the CPU 401 first deletes the character 40A "r" to the left of the cursor 41 in the character string 40, then relocates the cursor 41 to the right side of the character 40A "e", which is to the left of the deleted character 40A. Next, as shown in the edit screen 101C, the CPU 401 moves the character string 40 to the right (the arrow 34) until the relocated cursor 41 is disposed in a position that is one character's width to the right of the right edge of the selection image 46. Therefore, even after the menu image 464 in the selection image 46 is selected and the character string 40 is edited, the user is able to continue checking the position of the cursor 41, as well as one of the adding position (the space to the right of the cursor 41) and the deleting position (one of the space to the right of the cursor 41 and the character 40A "e" to the left of the cursor 41) that is indicated by the cursor 41.

In the first embodiment, in a case where the selection image 46 is displayed on the display portion 4, the CPU 401 moves the character string 40 to the left until the cursor 41 is displayed in a position that is one character's width to the left of the left edge of the selection image 46. Specifically, in the processing at Step S47, the CPU 401 computes the first movement value by adding 1 as the specified value to the subtraction value. The CPU 401 thus moves the character string 40 and the cursor 41 that are displayed on the display portion 4 to the left by the amount of the first movement value. In contrast, the specified value may be zero. That is, the CPU 401 may set the first movement value to the subtraction value. The CPU 401 may then move the character string 40 and the cursor 41 that are displayed on the display portion 4 to the left by the amount of the first movement value. In that case, the character string 40 that is displayed on the display portion 4 is moved to the left until the cursor 41 is displayed in the same position as the left edge of the selection image 46. The amount by which the character string 40 is moved is thus kept to the minimum. It is therefore possible to display the maximum number of the characters 40A in the first display area 4A. Therefore, the user is able to recognize a greater number of the characters in the character string 40.

In the first embodiment, the specific value of the specified value is 1. The specified value may be changed to another value (Z) that is not less than 2. In that case, when the selection image 46 is displayed, the cursor 41 may be displayed in a position that is Z characters' width to the left of the left edge of the selection image 46.

In the first embodiment, the right edge of the selection image 46 is displayed to left of the right edge of the display portion 4. In contrast, the right edge of the selection image 46 may be displayed in the same position as the right edge of the display portion 4. In the first embodiment, the bottom edge of the selection image 46 is displayed above the bottom edge of the display portion 4. In contrast, the bottom edge of the selection image 46 may be displayed in the same position as the bottom edge of the display portion 4.

In the first embodiment and the modified example, the left-right length of the selection image 46 is shorter than the left-right length of the display portion 4. In the first embodiment and the modified example, the selection image 46 is displayed to one of the right (refer to FIG. 3) and the left (refer to FIG. 6) of the center, in the left-right direction, of the display portion 4. In contrast, the left-right length of the selection image 46 may be made longer than one-half of the left-right length of the display portion 4. In that case, the selection image 46 is disposed to both the left and the right of the center, in the left-right direction, of the display portion 4. The CPU 401 may move the character string 40 and the cursor 41 to the left such that the cursor 41 is displayed to the left of the left edge of the selection image 46 whose left-right length is greater than it is in the first embodiment. The CPU 401 may move the character string 40 and the cursor 41 to the right such that the cursor 41 is displayed to the right of the right edge of the selection image 46 whose left-right length is greater than it is in the modified example of the first embodiment.

In the first embodiment and the modified example, the selection image 46 is displayed in a fixed position to one of the right (refer to FIG. 3) and the left (refer to FIG. 6) of the center, in the left-right direction, of the display portion 4. In contrast, the CPU 401 may switch between displaying the selection image 46 on the left side and displaying the selection image 46 on the right side, in accordance with the type of the pressed Fn key. The CPU 401 may switch the menu images 461 to 464 that are contained in the selection image 46, in accordance with the type of the pressed Fn key. The CPU 401 may vary the specified value in accordance with the editing actions that are indicated by the menu images 461 to 464 that are contained in the selection image 46.

in the second embodiment, the CPU 401 displays the selection image 71 in the third area 70 in response to the pressing of one of the Fn keys on the keyboard 5. In this case, the CPU 401 moves the print image 51 to the left (the arrow 81 (refer to FIG. 7); Step S147 (refer to FIG. 9)) to a position where the selected block 51C is not overlapped by the selection image 71, or in other words, until the selected block 51C is disposed in the first residual area 50A. In contrast, the CPU 401 may use a different method for modifying the form in which the print image 51 is displayed. A modified example of the second embodiment will hereinafter be explained.

Figure 11:
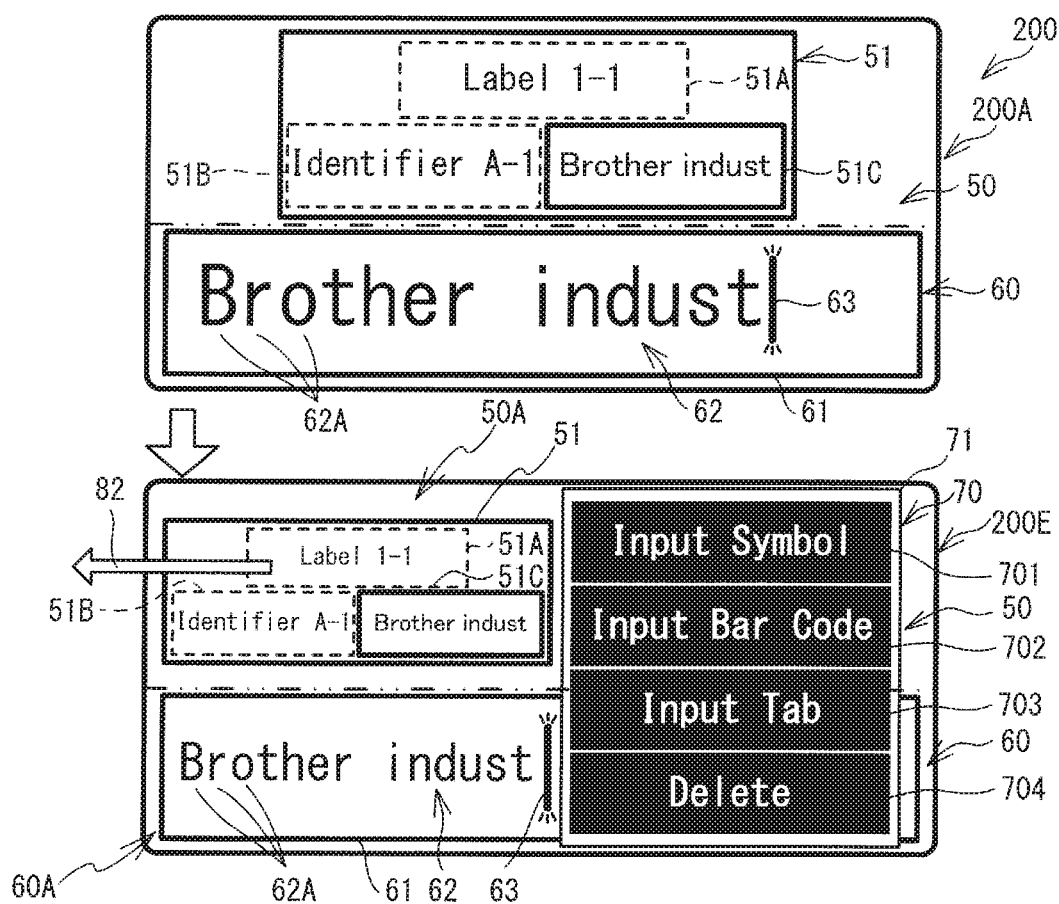
FIG. 11 is a figure that shows edit screens in a modified example of the second embodiment.

The edit screen 200 (the edit screen 200A, an edit screen 200E) that is displayed on the display portion 4 will be explained with reference to FIG. 11. The edit screen 200A that is shown in FIG. 11 is the same as the edit screen 200A that is shown in FIG. 7. A case in which one of the Fn keys on the keyboard 5 is pressed and the selection image 71 is displayed in the third area 70 will be explained with reference to the edit screen 200E. In the modified example, unlike on the edit screens 200B to 200D that are shown in FIG. 7, the print image 51 is disposed in the first residual area 50A in reduced form. Specifically, the CPU 401 first moves the print image 51 to the left (the arrow 82) until the entire selected block 51C is disposed in the first residual area 50A. Next, the CPU 401 determines whether the entire print image 51 that has been moved fits into the first residual area 50A. In a case where it is determined that the moved print image 51 does not fit into the first residual area 50A, and that a portion of the moved print image 51 protrudes beyond the first residual area 50A, the CPU 401 reduces the print image 51 such that the entire print image 51 fits into the first residual area 50A. Next, the CPU 401 displays the reduced print image 51 in the first residual area 50A. In this case, the user is able to check the entire print image 51, even after the selection image 71 is displayed. The method for displaying the character string 62 in the input frame 61 of the second residual area 60A is the same as in the second embodiment.

The fourth main processing in the modified example of the second embodiment will be explained with reference to FIG. 9. The processing that is different from the fourth main processing in the embodiment that is described above is the processing at Steps S147 and S148. In a case where it is determined that the selection image 71 overlaps the selected block 51C (YES at Step S145), the CPU 401 moves the print image 51 to the left such that the selected block 51C fits into the first residual area 50A (Step S147). In a case where it is determined that a portion of the print image 51 protrudes beyond the first residual area 50A, the CPU 401 reduces the print image 51 such that the print image 51 fits into the first residual area 50A (Step S147). Specifically, the CPU 401 computes a reduction ratio U by dividing the horizontal length L3 of the print image 51 by a horizontal length L4 of the first residual area 50A. Based on the reduction ratio U, the CPU 401 reduces the lengths of the vertical and horizontal dimensions of the moved print image 51. The CPU 401 displays the reduced print image 51 in the first residual area 50A (Step S148). The CPU 401 advances the processing to Step S149.

As explained above, in a case where it is determined that the selection image 71 overlaps the selected block 51C (YES at Step S145), the CPU 401 may reduce the print image 51 until the print image 51 becomes smaller than the first residual area 50A (Step S147). The CPU 401 may display the reduced print image 51 in the first residual area 50A (Step S148). In this way, the CPU 401 is able to inhibit the selection image 71 from overlapping the selected block 51C and to inhibit a portion of the print image 51 from not being displayed. The user is therefore able to perform editing of the character string 62 while checking the entire print image 51. Therefore, the editing of the character string 62 can be performed appropriately.

In the second embodiment and the modified example, the CPU 401 displays the selection image 71 to the right of the center, in the left-right direction, of the display portion 4. The CPU 401 may display the selection image 71 to the left of the center, in the left-right direction, of the display portion 4. In the second embodiment and the modified example, the left-right length of the selection image 71 is shorter than the left-right length of the display portion 4. The selection image 71 is displayed to the right of the center, in the left-right direction, of the display portion 4. In contrast, the left-right length of the selection image 71 may be made longer than one-half of the left-right length of the display portion 4. In that case, the selection image 71 is disposed to both the left and the right of the center, in the left-right direction, of the display portion 4. The CPU 401 may move the character string 62 and the cursor 63 to the left such that the cursor 63 is displayed to the left of the left edge of the selection image 71 whose left-right length is greater than it is in the second embodiment and the modified example. The CPU 401 may move the character string 62 and the cursor 63 to the right such that the cursor 63 is displayed to the right of the right edge of the selection image 71 whose left-right length is greater than it is in the second embodiment and the modified example.

In the second embodiment and the modified example, the selection image 71 is displayed in a fixed position to the right of the center, in the left-right direction, of the display portion 4. In contrast, the CPU 401 may switch between displaying the selection image 71 on the left side and displaying the selection image 71 on the right side, in accordance with the type of the pressed Fn key. The CPU 401 may switch the menu images 701 to 704 that are contained in the selection image 71, in accordance with the type of the pressed Fn key.

In the second embodiment, the CPU 401 computes the reduction ratio S by dividing the second character count by the second cursor position offset. The CPU 401 may also compute the reduction ratio by a different method. For example, the CPU 401 may compute a reduction ratio s by taking the number of the characters 62A that are not displayed, due to the selection image 71, when the characters 62A stored in the second buffer are displayed in the input frame 61 at their initial size, then dividing the number of the undisplayed characters 62A by the second cursor position offset. The CPU 401 may compare the computed reduction ratio s to a specified threshold value t (for example, 0.20). In a case where the reduction ratio s is not greater than the threshold value t, the CPU 401 may compute a value (1−s) by subtracting the reduction ratio s from 1. The CPU 401 may then change (reduce) the font size of the characters 62A in the character string 62 that is stored in the second buffer by multiplying the initial size P by the value (1−s). On the other hand, in a case where the reduction ratio s is greater than the threshold value t, the CPU 401 may compute a value (1−t) by subtracting the threshold value t from 1. The CPU 401 may then change (reduce) the font size of the characters 62A in the character string 62 that is stored in the second buffer by multiplying the initial size P by the value (1−t).

The processing will now be described in detail. A case in which the second cursor position offset is 18 and the second character count is 15 is used as an example. The reduction ratio s is computed as 3/18=0.17. In this case, the left-right lengths of the characters 62A that are shown at the initial size P need to be reduced by 17%. The CPU 401 compares the reduction ratio s to the threshold value t (for example, 0.20). The reduction ratio s is not greater than the threshold value t. Therefore, the CPU 401 changes (reduces) the font size of the characters 62A in the character string 62 that is stored in the second buffer by multiplying the initial size P by the value (1−s=0.83).

By way of contrast, a case in which the second cursor position offset is 19 and the second character count is 15 is used as an example. The reduction ratio s is computed as 4/19=0.21. In this case, the left-right lengths of the characters 62A that are shown at the initial size P need to be reduced by 21%. The CPU 401 compares the reduction ratio s to the threshold value t (for example, 0.20). The reduction ratio s is greater than the threshold value t. Therefore, the CPU 401 changes (reduces) the font size of the characters 62A in the character string 62 that is stored in the second buffer by multiplying the initial size P by the value (1−t=0.80).

In the second embodiment, the CPU 401 makes the characters 62A stored in the second buffer the targets of the reduction that is based on the reduction ratio S. In contrast, the CPU 401 may instead reduce the characters 62A stored in the first buffer, based on the reduction ratio S, and display the reduced characters 62A in the input frame 61. In that case, all of the input characters 62A are reduced and displayed in the input frame 61. Therefore, the user is able to recognize all of the input characters 62A, even after the selection image 71 is displayed.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An editing apparatus comprising:
a processor; and
a memory configured to store computer-readable instructions, wherein the computer-readable instructions, when executed by the processor, cause the editing apparatus to perform processes comprising:
 causing a print image to be displayed in a first area of a display portion and a mark and at least one portion of a target character string to be displayed in a second area of the display portion, the print image including a plurality of blocks, a plurality of character strings being respectively associated with the plurality of blocks, the target character string being one of the plurality of character strings that corresponds to a corresponding block, the corresponding block being one of the plurality of blocks, the mark indicating a position where editing is to be performed on the target character string, and the second area being a different area from the first area;
 causing a selection image to be displayed in a third area of the display portion in a state in which the print image is displayed in the first area and the target character string is displayed in the second area, the selection image being an image to be used for selecting one of a plurality of editing actions, and the third area including at least one portion of the first area and at least one portion of the second area;
 performing a first determination whether the corresponding block included in the print image displayed in the first area overlaps with the selection image displayed in the third area;
 causing all of the corresponding block to be displayed in a first residual area by modifying a form in which the print image is displayed, in response to determining that the corresponding block overlaps with the selection image, the first residual area being an area, within the first area, that is exclusive of the third area;
 performing a second determination whether the mark displayed in the second area overlaps with the selection image displayed in the third area;
 reducing a size of the target character string in response to determining that the mark overlaps with the selection image; and
 causing the mark and at least one portion of a reduced character string to be displayed in a second residual area, the reduced character string being the target character string whose size is reduced, and the second residual area being an area, within the second area, that is exclusive of the third area.

2. The editing apparatus according to claim 1, wherein the causing all of the corresponding block to be displayed in the first residual area includes:
 moving the print image to a position where all of the corresponding block is displayed in the first residual area; and
 causing the moved print image to be displayed in the first residual area.

3. The editing apparatus according to claim 1, wherein the causing all of the corresponding block to be displayed in the first residual area includes: reducing a size of the print image to a size that is smaller than a size of the first residual area; and causing a reduced image to be displayed in the first residual area, the reduced image being the print image whose size is reduced.

4. The editing apparatus according to claim 1, wherein the computer-readable instructions, when executed by the processor, further cause the editing apparatus to perform processes comprising:
 computing a reduction ratio by which the size of the target character string is to be reduced; and
 performing a third determination whether the computed reduction ratio and a specified threshold value satisfy a specified condition, and
the reducing the size of the target character string includes:
 reducing the size of the target character string based on the reduction ratio in response to determining that the specified condition is satisfied; and reducing the size of the target character string based on the specified threshold value in response to determining that the specified condition is unsatisfied.

5. The editing apparatus according to claim 4, wherein
the computing the reduction ratio includes computing the reduction ratio as a ratio of the reduced size of the target character string to the size of the target character string before the size of the target character string is reduced, and
the performing the third determination includes determining that the specified condition is satisfied in a case where the reduction ratio is one of equal to and greater than the specified threshold value and determining that the specified condition is unsatisfied in a case where the reduction ratio is less than the specified threshold value.

6. The editing apparatus according to claim 4, wherein
the computing the reduction ratio includes computing the reduction ratio as a ratio of a difference to the size of the target character string before the size of the target character string is reduced, the difference being a difference between the size of the target character string before the size of the target character string is reduced and the reduced size of the target character string, and
the performing the third determination includes determining that the specified condition is satisfied in a case where the reduction ratio is one of equal to and less than the specified threshold value and determining that the specified condition is unsatisfied in a case where the reduction ratio is greater than the specified threshold value.

7. The editing apparatus according to claim 4, wherein the causing the mark and the at least one portion of the reduced character string to be displayed in the second residual area includes causing the at least one portion of the reduced character string to be displayed by moving the reduced character string to a position where the mark is displayed in the second residual area, in a case where a first length is greater than a second length, the first length being a horizontal length to a position of the mark from a start of the reduced character string reduced based on the specified threshold value, and the second length being a horizontal length of the second residual area.

8. The editing apparatus according to claim 1, wherein
the computer-readable instructions, when executed by the processor, further cause the editing apparatus to perform a process comprising:
receiving an operation that selects one of the plurality of editing actions based on the displayed selection image, and
the reducing the size of the target character string includes reducing the size of the target character string based on a position of the mark after the target character string is edited in accordance with the selected one of the plurality of the editing actions, in a case where the operation that selects the one of the plurality of the editing actions is received.

9. The editing apparatus according to claim 1, wherein
the mark is a cursor being a straight line segment that extends vertically,
the cursor is configured to indicate right of the straight line segment as an adding position where a character is to be added to the target character string, and
the cursor is configured to indicate one of left and the right of the straight line segment as a deleting position where a character is to be deleted from the target character string.

10. A printer comprising the editing apparatus according to claim 1, further comprising:
a printing portion configured to print on a printing medium,
wherein the computer-readable instructions, when executed by the processor, further cause the editing apparatus to perform a process comprising:
causing the printing portion to print on the printing medium, based on the print image displayed on the display portion.

* * * * *